(12) United States Patent
Shiimado et al.

(10) Patent No.: US 6,920,384 B2
(45) Date of Patent: Jul. 19, 2005

(54) DRIVING FORCE CONTROL APPARATUS FOR VEHICLE

(75) Inventors: Toshihiro Shiimado, Anjo (JP); Kazuomi Okasaka, Anjo (JP); Yuuji Imanaga, Anjo (JP); Tadashi Tamura, Toyota (JP); Daisuke Inoue, Toyota (JP); Hiroji Taniguchi, Toyota (JP); Fumiharu Ogawa, Hekinan (JP)

(73) Assignees: Aisin Aw Co. Ltd., Anjo (JP); Toyota Jidosha Kabushiki Kaisha, Toyota (JP)

(*) Notice: Subject to any disclaimer, the term of this patent is extended or adjusted under 35 U.S.C. 154(b) by 6 days.

(21) Appl. No.: 10/321,627

(22) Filed: Dec. 18, 2002

(65) Prior Publication Data
US 2003/0130780 A1 Jul. 10, 2003

(30) Foreign Application Priority Data
Dec. 25, 2001 (JP) .................................. 2001-392201

(51) Int. Cl.[7] ............................................. F16H 61/02
(52) U.S. Cl. ........................... 701/65; 701/55; 701/64; 477/97
(58) Field of Search ............................. 701/65, 55, 56, 701/61, 64; 477/37, 46, 97

(56) References Cited

U.S. PATENT DOCUMENTS

| 6,098,005 A | * | 8/2000 | Tsukamoto et al. ............ 701/65 |
| 6,174,262 B1 | * | 1/2001 | Ohta et al. ..................... 477/97 |
| 6,278,928 B1 | * | 8/2001 | Aruga et al. ................... 701/65 |
| 2002/0042672 A1 | * | 4/2002 | Shiiba et al. .................. 701/65 |

FOREIGN PATENT DOCUMENTS

| JP | A 11-222055 | 8/1999 |
| JP | 11-230322 | 8/1999 |

* cited by examiner

Primary Examiner—Tan Q. Nguyen
(74) Attorney, Agent, or Firm—Oliff & Berridge, PLC

(57) ABSTRACT

A driving force control apparatus for a vehicle includes an accelerator opening sensor that detects an accelerator opening for a vehicle, and an automatic transmission control device that controls an automatic transmission based on road information and the accelerator opening. The automatic transmission control device, in an interval prior to a deceleration required interval, controls an automatic transmission so as to ease a shifting operation that corresponds to a decrease in the accelerator opening.

26 Claims, 14 Drawing Sheets

| TURNING ANGLE θ | CORNER SHAPE |
|---|---|
| $\theta 1 \leq \theta < \theta 2$ | GENTLE CORNER |
| $\theta 2 \leq \theta < \theta 3$ | MODERATE CORNER |
| $\theta 3 \leq \theta$ | SHARP CORNER |

$\theta 1 < \theta 2 < \theta 3$

DRIVING FORCE CONTROL APPARATUS FOR VEHICLE

BACKGROUND OF THE INVENTION

1. Field of Invention

The present invention relates to a driving force control apparatus for a vehicle.

2. Description of Related Art

Conventionally, in a vehicle that has a navigation device installed, a driving force control apparatus for a vehicle is provided so that driving force control can be conducted in association with road condition data provided by the navigation device. In this case, for example, when it is detected that a vehicle is approaching a corner (curve), and when specified conditions that are based on the operations of a driver are satisfied, corner control for decelerating the vehicle, such as downshifting, is conducted as the drive force control. Next, the upper limit shifting speed is determined, and it is set up so that a shifting speed (a shifting speed on the high speed side, a shifting speed with a small shift ratio, and the like) that is higher than the upper limit shifting speed is not selected.

In this case, the driving force control apparatus for a vehicle carries out calculations based on various data such as the road condition data, vehicle speed and accelerator opening that are provided by the navigation device, creates data for control, and conducts corner control based on the data for control.

Also, recently, with the advent of continuously variable transmissions that can continuously control the shift ratio, a driving force control apparatus for a vehicle that controls the shift ratio of the continuously variable transmission and conducts corner control has been proposed (refer to Japanese Patent Application Laid-Open No. 11-222055). In the driving force control apparatus for a vehicle, when it is detected that the vehicle is approaching a corner based on the road condition data that is provided by the navigation device, and the driver releases the accelerator pedal (closes the accelerator), the shift ratio is increased, in other words, the continuously variable transmission is controlled so that it down shifts.

Since the intention of a driver to decelerate when approaching a corner is detected due to accelerator operations by the driver, it is possible to produce a deceleration force caused by engine braking that is larger than usual, the driving force control that coincides with the accelerator operations by the driver can be conducted, and the drivability for the vehicle can be improved.

SUMMARY OF THE INVENTION

In a conventional driving force control apparatus for a vehicle, because the control of the continuously variable transmission begins after the driver releases the accelerator pedal, drivability sometimes worsens.

For example, when the vehicle approaches a corner with the driver depressing the accelerator pedal, and, next, the driver decides to decelerate and returns the accelerator pedal (closes the accelerator), because it is detected that the accelerator pedal is being returned before the accelerator pedal is brought into a released state, the continuously variable transmission is controlled so that the shift ratio becomes smaller, that is, upshifting is executed (off up). Next, because it is detected that the accelerator pedal has been released, the continuously variable transmission is controlled so that it downshifts.

In this case, because upshifting is conducted and the deceleration force by the engine brake becomes small when the pedal is being returned in order to decelerate, the driver experiences a sensation of idle running. Also, because downshifting is conducted directly after upshifting is conducted, so-called busy shifting occurs, and the driving force for the vehicle fluctuates. Therefore, the driver experiences a feeling of discomfort. As a result, driving force control that coincides with the accelerator operations by the driver cannot be conducted, and the drivability worsens.

In view of the foregoing problem, an object of the present invention is to provide a driving force control apparatus and a method of controlling a driving force for a vehicle that solves the problems of a conventional driving force control apparatus, and can carry out driving force control that coincides with the accelerator operations by a driver and can improve drivability for a vehicle by appropriately controlling an automatic transmission in response to the accelerator operation of the driver when a vehicle approaches a deceleration required interval, that is an interval at which deceleration is required, such as a corner and a descending slope, without unnecessary upshifting and the occurrence of busy shifting.

Therefore, the driving force control apparatus for a vehicle of the present invention includes an accelerator opening sensor that detects the accelerator opening for a vehicle, and an automatic transmission control device that controls an automatic transmission based on a road information and the accelerator opening, wherein the automatic transmission control device, in an intervals prior to a deceleration required interval, controls the automatic transmission so as to ease a shifting operation that corresponds to a decrease in the acceleration opening.

Additionally, the method of controlling a driving force for a vehicle of the present invention includes detecting an accelerator opening for a vehicle, and controlling an automatic transmission based on a road information and the accelerator opening, wherein controlling the automatic transmission, in an interval prior to a deceleration required interval, eases a shifting operation that corresponds to a decrease in the acceleration opening.

In this case, when the vehicle approaches the deceleration required interval, by appropriately operating the automatic transmission in response to the accelerator operation by the driver, unnecessary upshifting is not executed and busy-shifting does not occur, and driving force control that coincides with the accelerator operations by the driver can be executed, and the drivability for the vehicle can be improved.

BRIEF DESCRIPTION OF THE DRAWINGS

The foregoing and further objects, features and advantages of the invention will become apparent from the following description of preferred embodiments with reference to the accompanying drawings, wherein like numerals are used to represent the elements and wherein.

DETAILED DESCRIPTION OF PREFERRED EMBODIMENTS

Hereinafter, a preferred embodiment of the present invention will be described in detail with reference to drawings.

Figure 2:
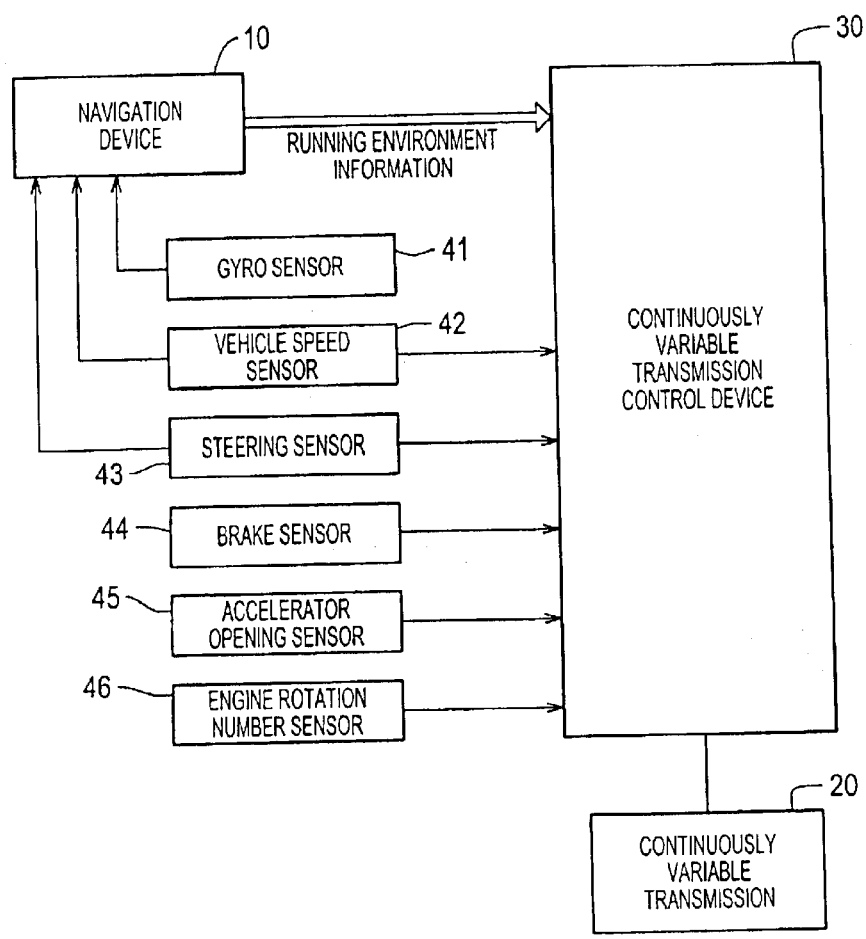
FIG. 2 is a block diagram schematically showing of a driving force control apparatus for a vehicle according to the first embodiment of the present invention.

FIG. 2 is a block diagram schematically showing a driving force control apparatus for a vehicle according to a first embodiment of the present invention.

As shown in FIG. 2, a reference numeral 10 denotes a navigation device that outputs running environment information for a vehicle as road information, a reference numeral 20 denotes a continuously variable transmission as the automatic transmission that continuously controls a shift ratio and transmits engine rotation to an axle, a reference numeral 30 denotes a continuously variable transmission control device as the automatic transmission control device that controls the variable transmission 20 based on the running environment information and an accelerator opening, a reference numeral 41 denotes a gyro sensor that detects a turning angle speed for a vehicle, that is, a turning angle, a reference numeral 42 denotes a vehicle speed sensor that detects a speed for the vehicle, a reference numeral 43 denotes a steering sensor that detects a steering angle for the vehicle steering that is operated by a driver, a reference numeral 44 denotes a brake sensor that detects the movement for a vehicle brake pedal that is operated by a driver, a reference numeral 45 denotes an accelerator opening sensor that detects the accelerator opening that is operated by a driver, and a reference numeral 46 denotes an engine rotation number sensor that detects the rotation number of the vehicle engine.

Further, the driving force control apparatus for a vehicle according to the invention can also be applied to a vehicle that has an automatic transmission with shifting speeds, but as a matter of convenience for explanation purposes, a case in which the automatic transmission is a continuously variable transmission will be explained. Also, the road information transmission device according to the present invention may be built into a control apparatus such as the automatic transmission control device and an engine control apparatus, and may be a information transmission center that transmits information such as traffic information and road condition information via a communication network such as a broadcast network for FM broadcasting and television broadcasting and a cellular phone network. However, as a matter of convenience for explanation purposes, a case in which the road information transmission device is the navigation device that is installed in a vehicle will be explained.

Here, the navigation device 10 is provided with a calculation unit such as a CPU and an MPU, a memory unit such as a semiconductor memory and a magnetic disk, an input unit such as a touch panel, remote controller and push button switch, a display unit such as a CRT and an LCD display, a sound production unit such as a speaker and a communications interface. The gyro sensor 41, the vehicle speed sensor 42 and the steering sensor 43 are connected to the navigation device 10. Also, the navigation device 10 is provided with a GPS (Global Positioning System) sensor, which is not shown, a terrestrial magnetism sensor, a distance sensor, a beacon sensor and an altimeter. The navigation device 10 detects the current vehicle location, directional bearing for a vehicle, vehicle speed and distance traveled by the vehicle based on signals from the gyro sensor 41, the speed sensor 42, the steering sensor 43, the GPS sensor, the terrestrial magnetism sensor, the distance sensor, the beacon sensor and the altimeter.

The GPS sensor detects the current location for a vehicle on the earth by receiving a electromagnetic wave that is produced by an artificial satellite, the terrestrial magnetism sensor detects the directional bearing for a vehicle by measuring the terrestrial magnetism, and the distance sensor detects the distance between specified locations on the road. The distance sensor, for example, a sensor that measures the rotation number for the vehicle wheels (not shown) and detects the distance based on the rotation number, and a sensor that measures acceleration, doubly integrates the acceleration to detect the distance that can be used. Also, the beacon sensor detects the current position for a vehicle by receiving positional information from a beacon that is provided along the road.

Further, the GPS sensor and the beacon sensor can each independently detect the current location for a vehicle. By combining the distance that is detected by the distance sensor with the directional bearing that is detected by the terrestrial magnetism sensor and the gyro sensor 41, the current position for a vehicle can also be detected. Moreover, by combining the distance that is detected by the distance sensor with the steering angle that is detected by the steering sensor 43, the current position for a vehicle can also be detected.

Also, the memory unit of the navigation device 10 is provided with a database that is made up of a map data file, an intersection data file, a node date file, a road data file, and a facility information data file that has stored information about facilities such as local hotels and gasoline stations. In addition to data used to search for routes, various types of data used for displaying guide maps of routes that were searched, and data used for displaying the distance until the next intersection and the traveling direction at the next intersection, as well as data used for displaying other guide information on the screen of the display unit are stored in the memory unit. Further, various types of data used for voice output of specified information are also stored in the memory unit. Moreover, the memory unit includes all forms of recording medium, such as magnetic tape, magnetic disks, magnetic drums, flash memory, CD-ROM, MD, DVD-ROM, optical disks, MO, IC cards, optical cards and memory cards, and removable external memory media may be also used.

Intersection data is stored in the intersection data file, node data is stored in the node data file, and road data is stored in the road data file, and road conditions are displayed on the screen of the display unit based on the intersection data, the node data and the road data. Further, the types of intersection, in other words, whether it is an intersection that has a traffic light, or an intersection that does not have a traffic light, is included in the intersection data. Moreover, the node data structures at least the position and shape of the road in the map data that is recorded in the map data file, and is made up of data that shows the branch points of the actual road (including intersection points and T-shaped intersections), node points, and the links that connect between node points. Further, the node points show at least the positions of bending points on the road.

Also, concerning the road itself, data such as the width of the road, the gradient, the cant, the altitude, the bank, the conditions of the road surface, the number of lanes of the road, the points where the number of lanes decreases and the points where the width of the road narrows are included in the road data. Further, in the case of an expressway and highway, each of the lanes in the opposite direction is stored as individual road data, and the expressway or the highway is processed as a two-rowed road. For example, for a highway with two or more lanes in each direction, the highway is processed as a two-rowed road, and the inbound lanes and the outbound lanes are stored in the road data as independent roads. Moreover, concerning corners, data such as the radius of the curvature, intersections, T-shaped intersections and corner entrances are included. Further, concerning the road attributes, data such as railway crossings, entrance ramps to highways, toll booths on highways, downward slopes, upward slopes and road classification (national road, main roads, general roads, highways, and the like) are included.

Further, the communication interface of the navigation device 10, while conducting communications between the continuously variable transmission control device 30, also sends and receives various types of data between FM transmission devices, telephone lines, the internet, and cellular phone networks. For example, it receives various types of data such as road information concerning the traffic that is received from an information sensor (not shown), traffic accident information, and D-GPS information that detects the detection error of the GPS sensor.

The navigation device 10 carries out various types of processing such as a search of a route to a destination, running guidance in the route, determination of a specific interval, and a search of places and facilities, and also displays a map on the screen of the display unit, the current position for the vehicle, the route to the destination from the current position, and guidance information in line with the route on the map. Further, the guidance information may be voice output by the sound production unit. Furthermore, the navigation device 10 calculates and outputs the running environment information as the road information that includes the shape of the corner and the like (including intersections, T-shaped intersections and entrance ramps to highways) that are located ahead for the vehicle on the road where the vehicle is running, and recommended speed at which the vehicle enters the corner and the like. Further, the running environment information is sent to the continuously variable transmission control device 30.

Also, the continuously variable transmission 20, for example, is a belt-type continuously variable transmission that has two V-pulleys that are each installed on the input shaft and the output shaft, and a rubber V-belt or a metal V-belt formed by combining a plurality of metal blocks that is wound on the two V-pulleys, and performs shifting by adjusting the distance between the inclined planes of the V-pulleys. However, the continuously variable transmission 20 may be any type of continuously variable transmission, such as a chain type continuously variable transmission that uses a chain in place of a V-belt and a friction type continuously variable transmission that transmits power by friction and traction using an umbrella-shaped friction gear and an idler.

The continuously variable transmission control device 30 is provided with a calculation unit such as a CPU and an MPU, a memory unit such as a semiconductor memory and a magnetic disk, and a communications interface. Further, the vehicle speed sensor 42, the steering sensor 43, the brake sensor 44, the accelerator opening sensor 45 and the engine rotation number sensor 46 are connected to the continuously variable transmission control device 30. Also, the continuously variable transmission control device 30 receives the running environment information that is output by the navigation device 10.

Here, the memory unit includes all forms of recording medium, such as magnetic tape, magnetic disks, magnetic drums, flash memory, CD-ROM, MD, DVD-ROM, optical disks, MO, IC cards, optical cards and memory cards, and removable external memory media may be also used. The continuously variable transmission control device 30, in accordance with the control program that is stored in the memory unit, causes the continuously variable transmission 20 to upshift or downshift. In this case, when upshifting, the shift ratio is made smaller. In a case in which the rotation number of the output shaft is constant, when upshifting is executed, the rotation number of the output shaft decreases. Also, when downshifting, the shift ratio is made larger. In a case in which the rotation number of the output shaft is constant, when downshifting is executed, the rotation number of the output shaft increases.

Next, when the driver operates a mode selection unit (not shown) and selects a normal mode, based on the vehicle speed detected by the vehicle speed sensor, the steering angle detected by the steering angle sensor 43, the accelerator opening detected by the accelerator opening sensor 45, the brake movement detected by the brake sensor 44, and the engine rotation number detected by the engine rotation number sensor 46, the continuously variable transmission control device 30 references the shift map (not shown) stored in the memory unit, controls the continuously variable transmission 20, and causes it to upshift or downshift.

Also, when the driver operates a mode selection unit (not shown) and selects a navigation mode, the continuously variable transmission control device 30 controls the continuously variable transmission 20 in response to the running environment information that is output by the navigation device 10, and by causing it to upshift or downshift, carries out driving force control for a vehicle. Further, even if navigation mode is not selected, the continuously variable transmission may constantly carry out driving force control for a vehicle. When the driving force control for a vehicle is executed, in a case in which the corners are continuous, winding control is executed. When the vehicle approaches an intersection, intersection control is executed, and when the vehicle approaches a corner, corner control is executed. Thus, the vehicle drivability does not worsen.

Further, as the gyro sensor 41, for example, a gas rate gyro and a vibration gyro are used. By integrating the turning angle that is detected by the gyro sensor 41, the directional bearing for the vehicle can be detected. Also, as the vehicle speed sensor 442, for example, an optical rotation sensor and a rotation resistance sensor that are attached to the axle (not shown) are used. Further, as the steering sensor 43, for example, an optical rotation sensor, a rotation resistance sensor, and an angle sensor that are attached to a rotation portion of the steering wheel (not shown) are used.

Next, the operation of the driving force control apparatus for a vehicle with the aforementioned structure will be explained.

Figures 3, 4:
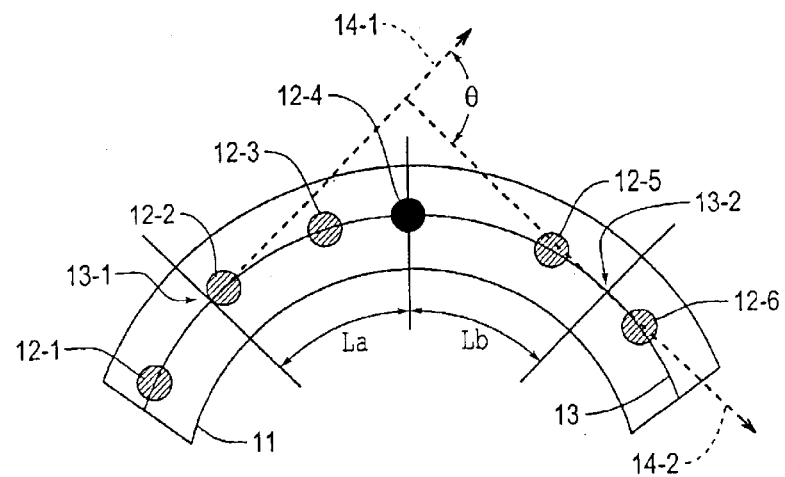
FIG. 3 is a diagram showing the operation of a corner shape determination according to the first embodiment of the present invention.
FIG. 4 is a diagram showing a table for corner shape determination according to the first embodiment of the present invention.
Figure 5:
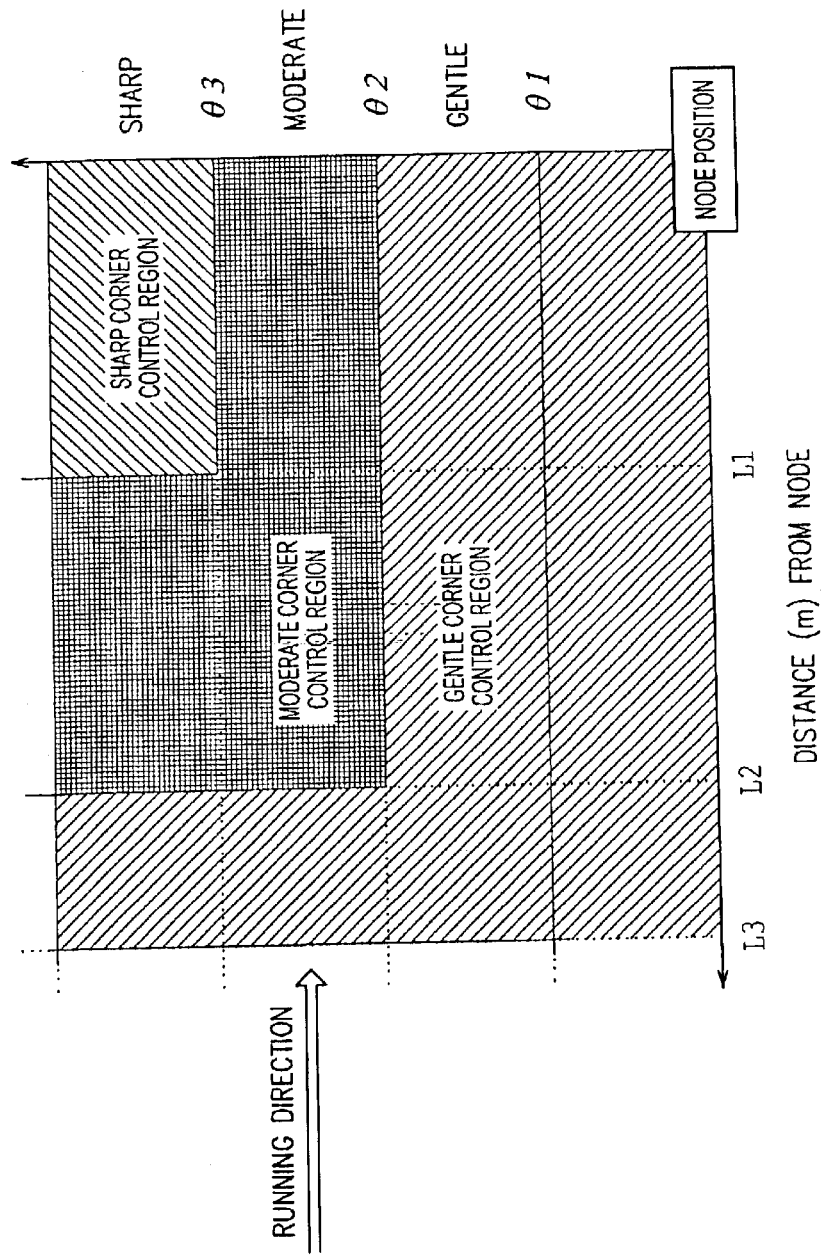
FIG. 5 is a diagram showing an example of the criterion for corner control area determination.
Figure 6:
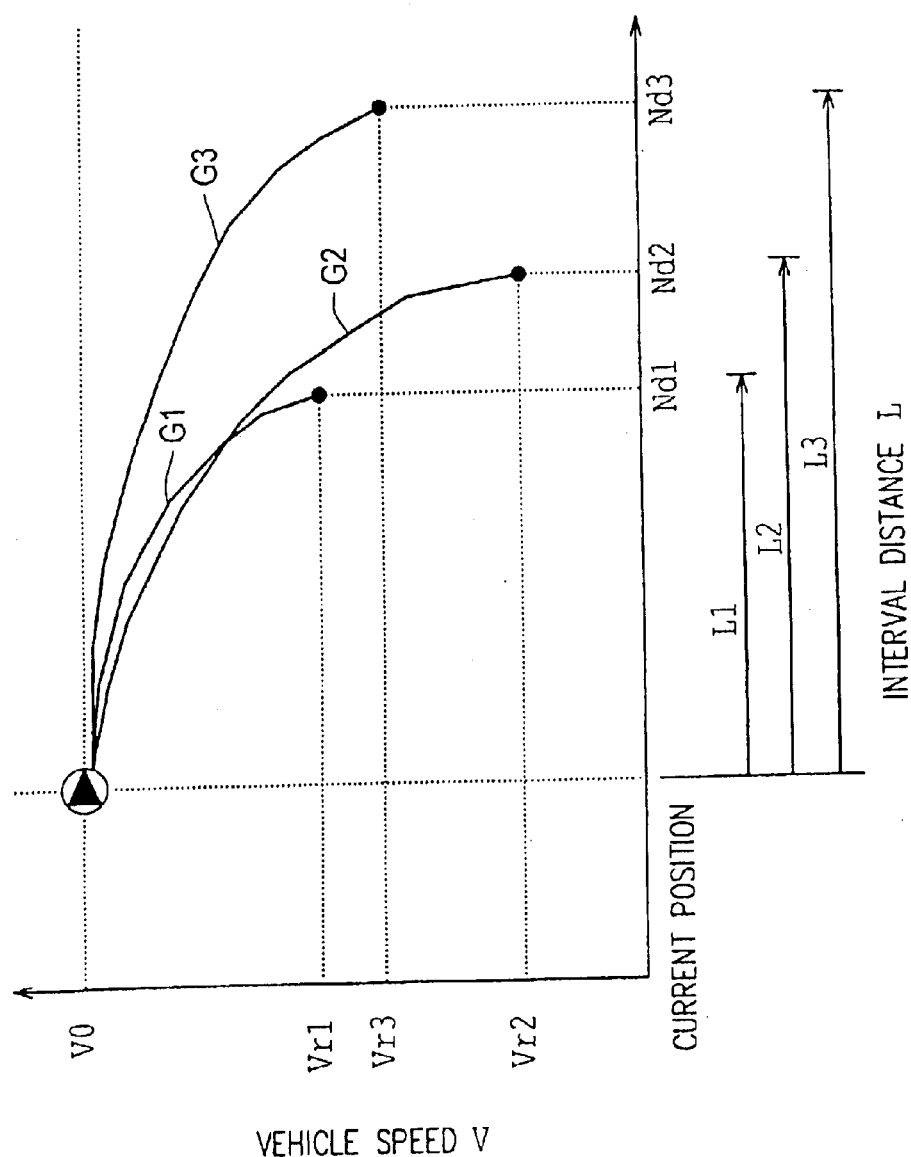
FIG. 6 is a diagram showing the calculation method for necessary deceleration according to the first embodiment of the present invention.
Figure 7:
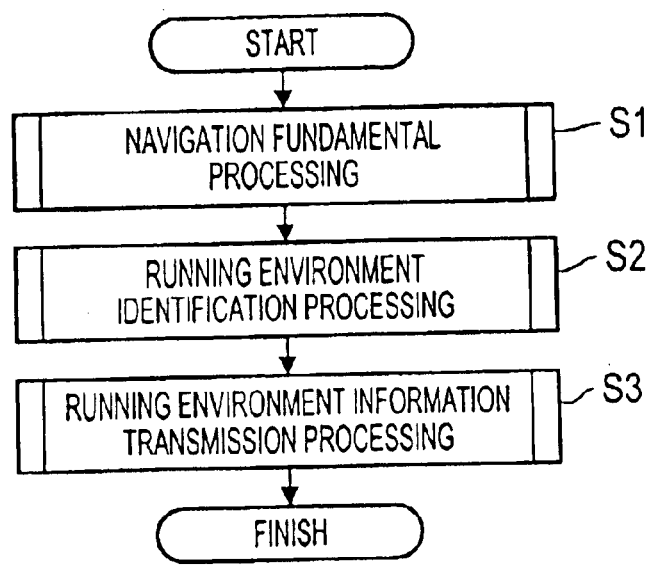
FIG. 7 is a flowchart showing the operation of a navigation device according to the first embodiment of the present invention.
Figure 8:
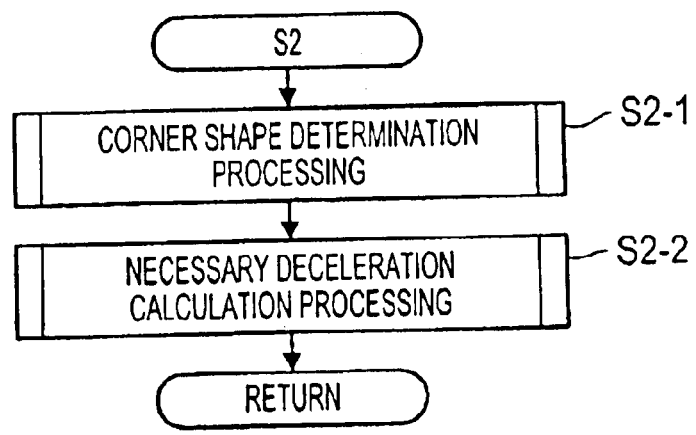
FIG. 8 is a diagram showing a subroutine of running environment identification processing according to the first embodiment of the present invention.

FIG. 3 is a diagram showing the operation of a corner shape determination according to the first embodiment of the present invention, FIG. 4 is a diagram showing a table for the corner shape determination according to the first embodiment of the present invention, FIG. 5 is a diagram showing an example of criteria for a corner control region determination according to the first embodiment of the present invention, FIG. 6 is a diagram showing a calculation method for the necessary deceleration according to the first embodiment of the present invention, FIG. 7 is a flowchart showing the operation of the navigation device according to the first embodiment of the present invention, and FIG. 8 is a diagram showing the subroutine of the running environment identification processing according to the first embodiment of the present invention. Further, in FIG. 5, the horizontal axis shows the distance from nodes and the vertical axis shows the corner shape based on the turning angle, and in FIG. 6, the horizontal axis shows an interval distance L and the vertical axis shows a vehicle speed V.

Herein, the driving force control for a vehicle will be explained in a case in which the vehicle approaches an interval for which it is necessary to decelerate, in other words, a deceleration required interval, such as a corner, an intersection, and a highway entrance ramp. Further, the embodiment will be explained where it is detected that the vehicle is approaching a corner, and corner control is executed as the driving force control. First, the operation of the navigation device 10 will be explained.

In this case, the navigation device 10 conducts a search for the current position for the vehicle, a search for a route to a destination, running guidance in the route, determination of a specific interval, and a search for places and facilities, displays a map on the screen of the display unit, and displays the current location for the vehicle, the route from the current location to the destination, and guidance information in line with the route on the map, in other words, it carries out navigation fundamental processing.

In the navigation fundamental processing, when it is detected that the vehicle has reached a specified position prior to the corner and it is judged that the vehicle is approaching the corner based on the current location for the vehicle and the road data, the navigation device 10 begins the running environment identification processing. The running environment identification processing calculates and processes the running environment information that is necessary for the driving force control for a vehicle, such as the shape of the corner and the analysis of the speed at which the vehicle enters the corner.

First, based on the node data that is stored in the node data file and the road data that is stored in the road data file, the navigation device 10 carries out the corner shape determination processing for determining the corner shape. According to the embodiment, the corner shape is determined to be either a gentle curve, a moderate curve or a sharp curve. In this case, as shown in FIG. 3, a turning angle $\theta$ is determined for each of the nodes 12-1 through 12-6 from tangential lines of the curve 13 that smoothly connects nodes 12-1 through 12-6 on the road 11.

Further, FIG. 3 shows an example in which the turning angle $\theta$ for the node 12-4 is determined. In this case, the angle $\theta$ between tangential lines 14-1 and 14-2 of the curve 13 on the points 13-1 and 13-2 on the curve 13 which are located at the specified distances La and Lb from the node 12-4 in the forward and backward directions is determined as the turning angle $\theta$ for the node 12-4. Then, as shown in FIG. 4, the turning angle $\theta$ is applied to the table that is created in advance and stored in the memory unit, and the corner shape is determined to be either a gentle curve, a moderate curve or a sharp curve. In other words, if the turning angle $\theta$ is $\theta_1$ or greater and less than $\theta_2$, then the corner shape is determined to be a gentle shape, if the turning angle $\theta$ is $\theta_2$ or greater and less than $\theta_3$, then the corner shape is determined to be a moderate shape, and if the turning angle $\theta$ is $\theta_3$ or greater, then the corner shape is determined to be a sharp curve. Further, the values such as La, Lb and $\theta_1$ through $\theta_3$, for example, can be La=35 (m), Lb=35 (m), $\theta_1$=20 (degrees), $\theta_2$=40 (degrees), $\theta_3$=90 (degree). However, they may be changed as appropriate.

Next, a range from a position at a specified distance prior to the nodes 12-1 through 12-6 to the nodes 12-1 through 12-6, or to a specified position that is determined based on the nodes 12-1 through 12-6 is determined as a corner control region. Further, based on the corner shape, the specified distance and the specified position can be changed as appropriate. In FIG. 5, an example of the criterion for judging the corner control region determined based on the corner shape is shown. In this case, the corner control region is divided into a gentle corner control region, a moderate corner control region, and a sharp corner control region. Here, the distances from the node L1 through L3 can be determined as appropriate. Further, the graph, table and calculation method that show the criteria as shown in FIG. 5 are created in advance and stored in the memory unit.

Next, the navigation device 10 carries out the necessary deceleration calculation processing in order to calculate the necessary deceleration that is necessary to decelerate the vehicle speed from the current speed to the recommended speed for the corner ahead. Here, the recommended vehicle speed is a vehicle speed for which the turning lateral acceleration is, for example, 0.2 (G). Further, the turning lateral acceleration value can be changed as appropriate. In this case, because the turning lateral acceleration is proportional to the square for the vehicle speed and inversely proportionate to the radius of the corner, if the turning lateral acceleration value is set, the recommended speed that corresponds to the radius of the corner can be obtained. For example, in a case in which the turning lateral acceleration is set at 0.2 (G), the recommended vehicle speed is 20 (km/h) if the corner radius is 15 (m), 30 (km/h) if the corner radius is 30 (m), 40 (km/h) if the corner radius is 60 (m), and 50 (km/h) if the corner radius is 100 (m).

Next, the necessary deceleration Gi (i is a natural number) that is necessary for the recommended speed Vri (i is a natural number) on the node Ndi (i is a natural number) located ahead for the vehicle is calculated. In this case, a vehicle speed V0 at the current position and a recommended vehicle speed Vri on each node Ndi that exists in a forward specified distance range (for example, 200 (m)) from the current location for the vehicle are determined. Next, a distance Li (i is a natural number) from the current position for the vehicle to each node Ndi is calculated. Then, the necessary deceleration G1 is calculated by the next equation (1).

$$Gi=(V0^2-Vri^2)/(2 \times Li) \qquad \text{Equation (1)}$$

Next, the maximum value of the necessary deceleration Gi that is calculated for each node Ndi is calculated, and is set as the final necessary deceleration. Further, in FIG. 6, the change in vehicle speed from the current position to each node Nd1, Nd2 and Nd3 is shown by three deceleration curves. In this case, each deceleration curve corresponds to each of the necessary decelerations G1, G2 and G3, and the larger the curvature of the deceleration curve, in other words, the sharper the bend, the greater the necessary deceleration. Therefore, in the example shown in FIG. 6, the necessary deceleration G2 that is calculated for the node Nd2 is the largest.

Finally, as the running environment information transmission processing, the navigation device 10 transmits the running environment information that includes the corner shape that was determined and the necessary deceleration that was set up, to the continuously variable transmission control device 30 via the communications interface (not shown). Further, the navigation fundamental processing, the running environment identification processing and the running environment information transmission processing are repeatedly executed at a specified cycle (for example, 16 (msec)).

Next, the flowchart will be explained. First, the flow chart in FIG. 7 that shows the overall process in the navigation device 10 will be explained.

Step S1 Navigation fundamental processing is executed.

Step S2 Running environment identification processing is executed.

Step S3 Running environment information transmission processing is executed

Next, the subroutine of the running environment identification processing in Step S2 of FIG. 7, as shown in FIG. 8, will be explained.

Step S2-1 Corner shape determination processing is executed.

Step S2-2 Necessary deceleration calculation processing is executed.

Next, the operation of the continuously variable transmission control device 30 will be explained.

Figure 9:
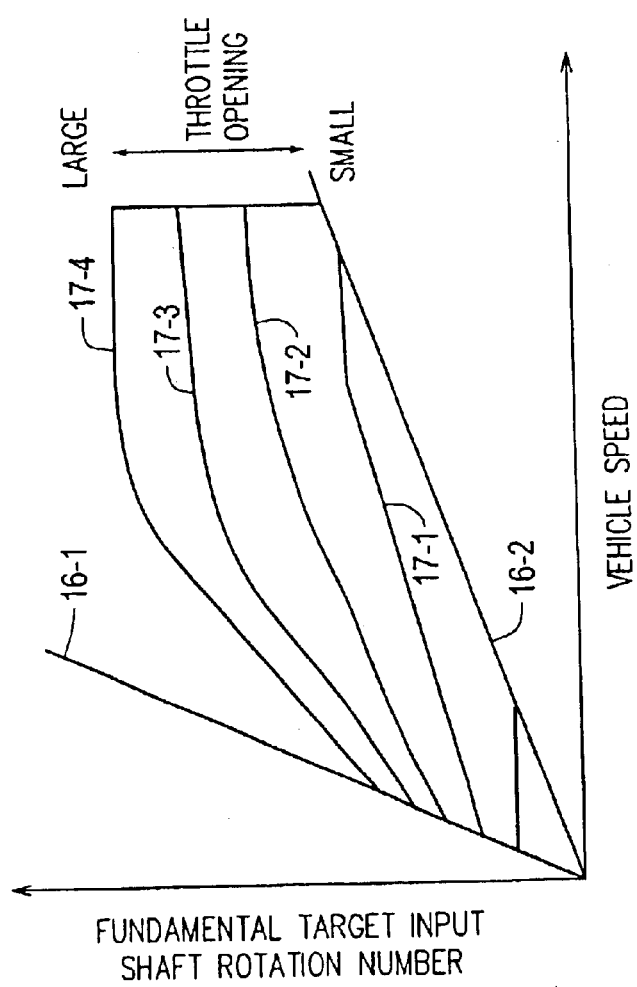
FIG. 9 is a diagram showing a fundamental target input shaft rotation number map according to the first embodiment of the present invention.
Figure 10:
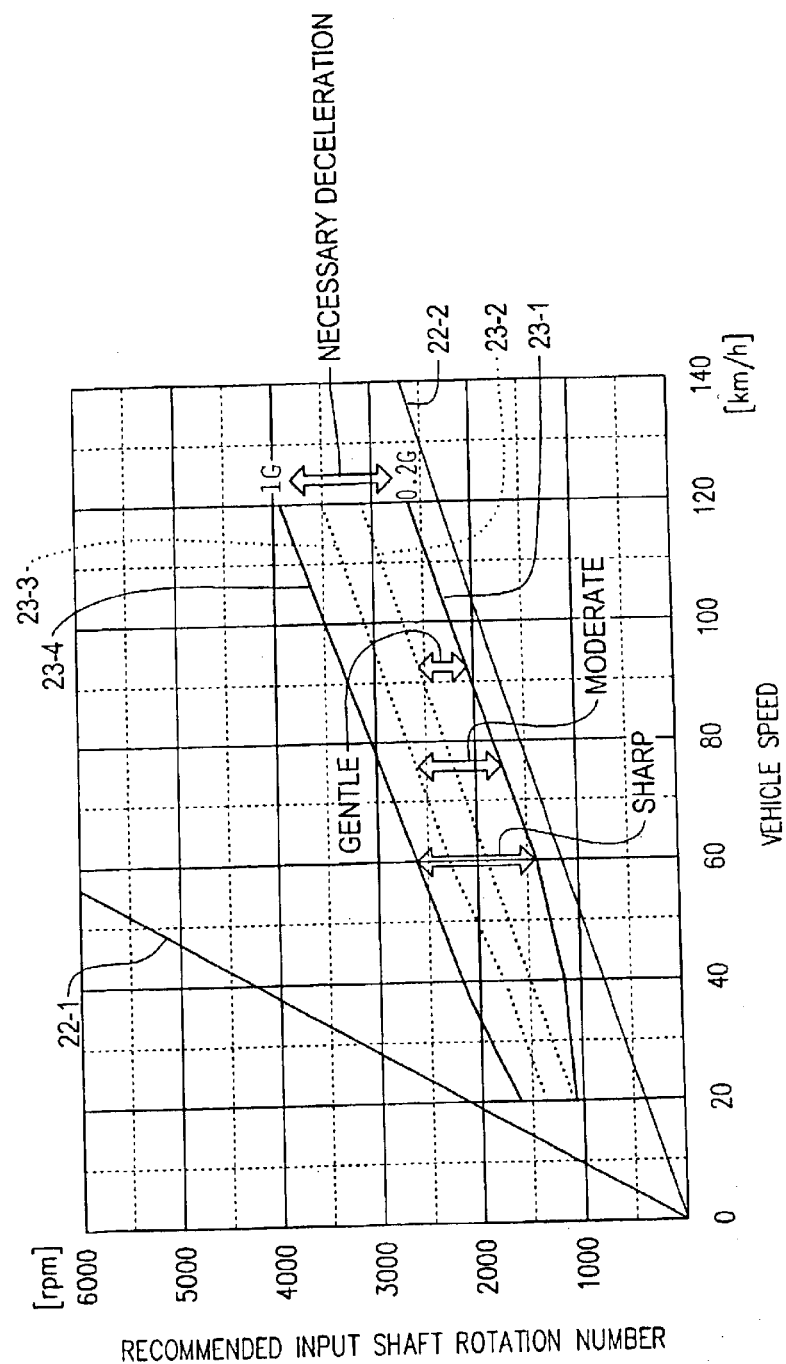
FIG. 10 is a diagram showing a recommended input shaft rotation number map for a corner according to the first embodiment of the present invention.
Figure 11:
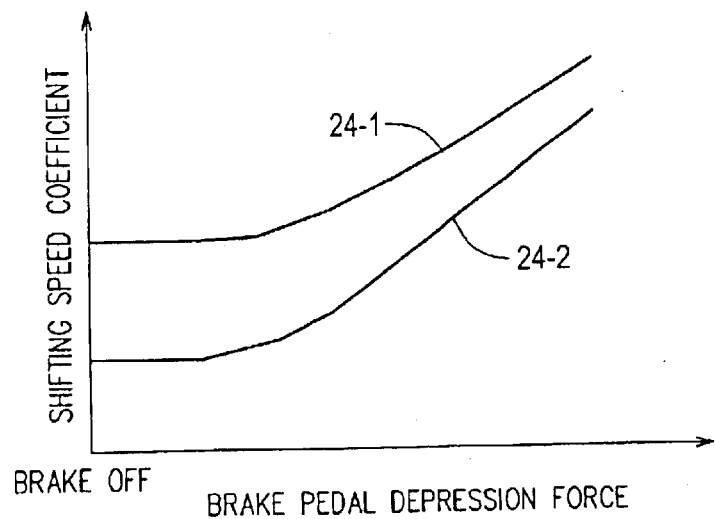
FIG. 11 is a diagram showing a shifting speed coefficient map corresponding to a brake pedal depression force according to the first embodiment of the present invention.
Figure 12:
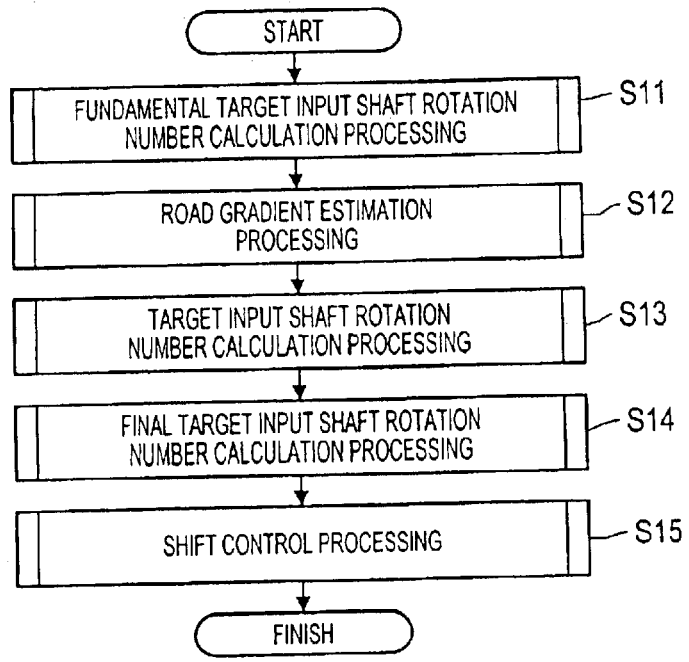
FIG. 12 is a flowchart showing the operation of a continuously variable transmission control device according to the first embodiment of the present invention.
Figure 13:
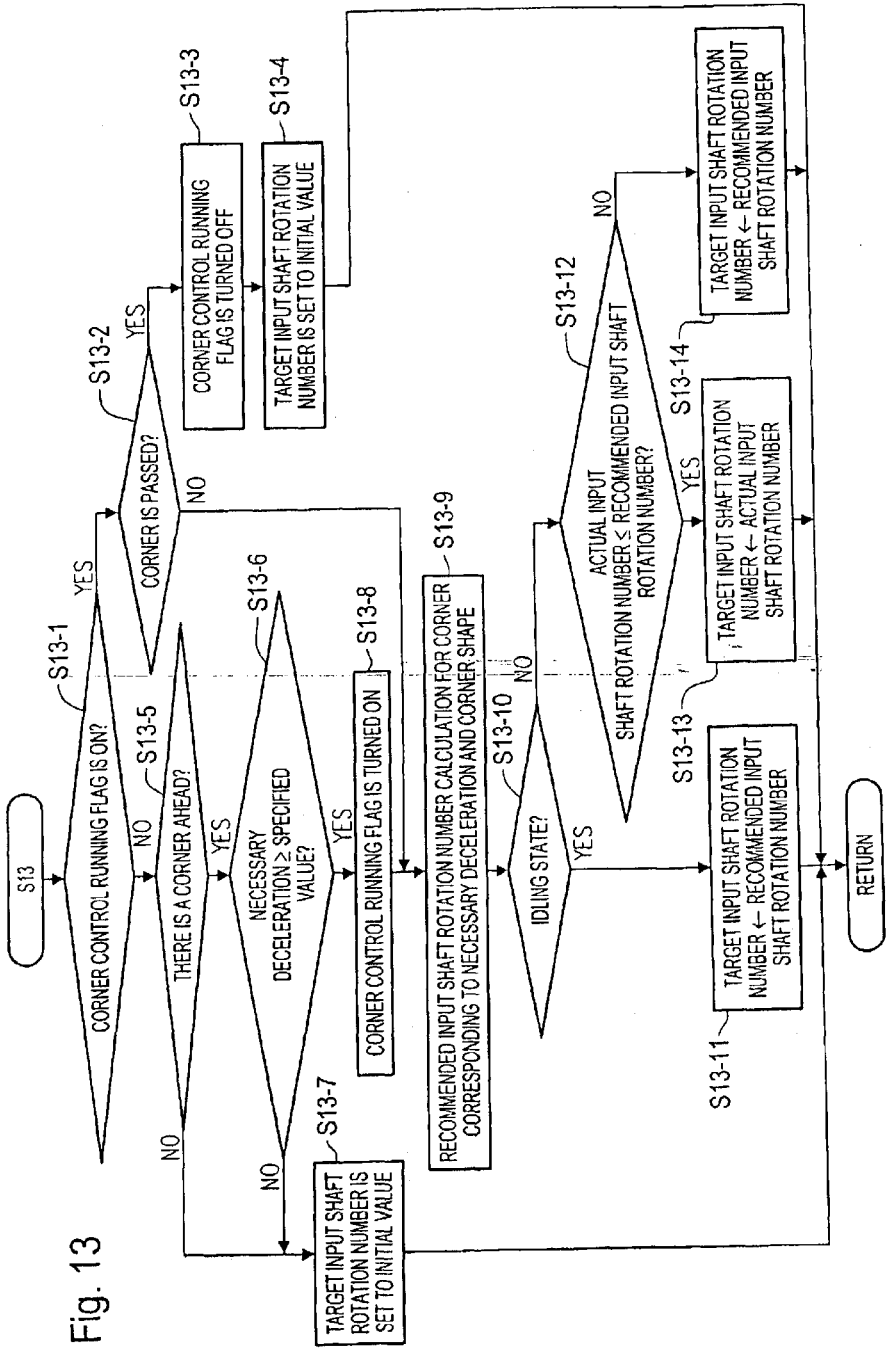
FIG. 13 is a flowchart showing a subroutine for target input shaft rotation number calculation processing for a corner according to the first embodiment of the present invention.
Figure 14:
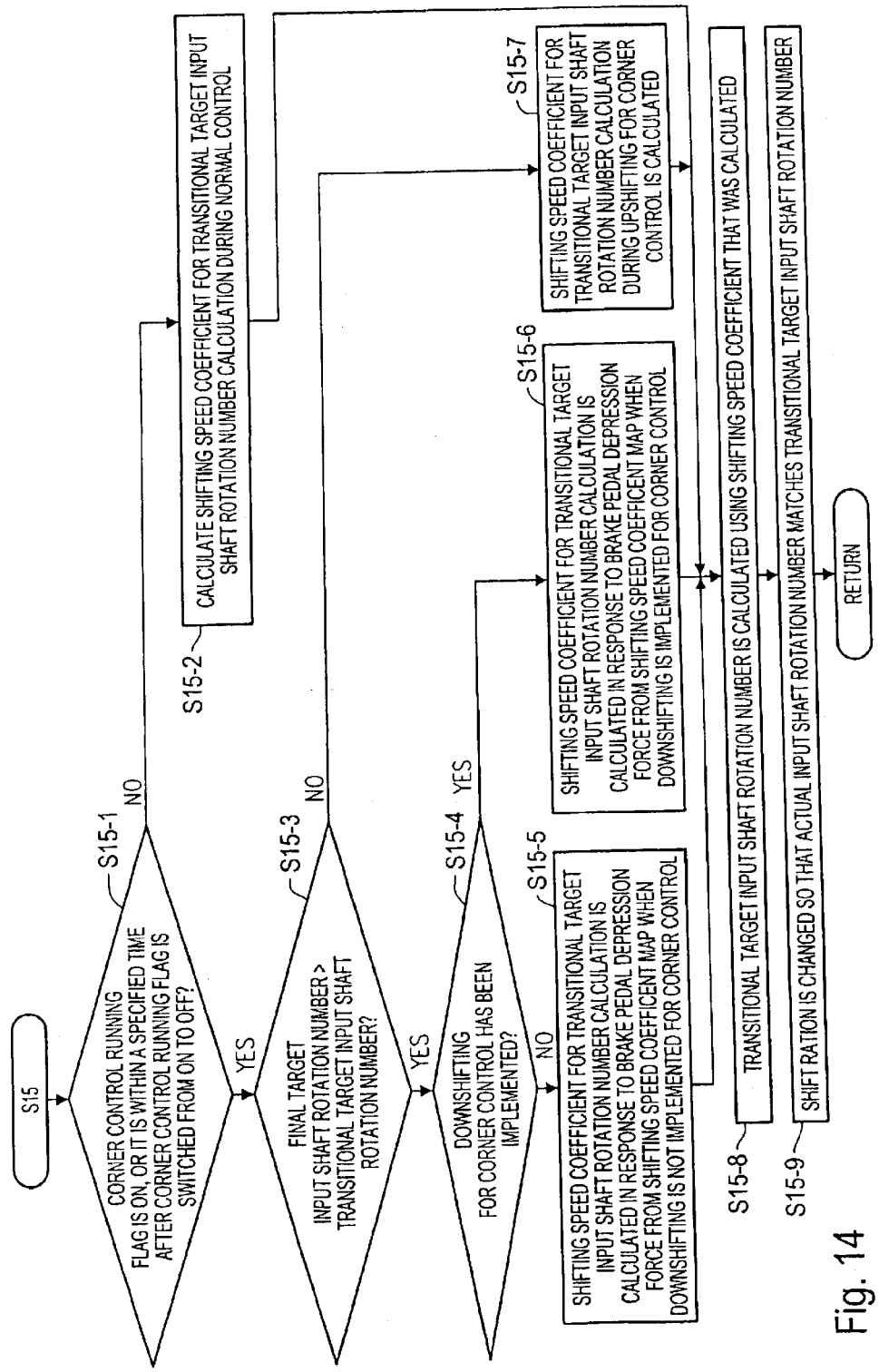
FIG. 14 is a flowchart showing a subroutine for shift control processing according to the first embodiment of the present invention.

FIG. 9 is a diagram showing a fundamental target input shaft rotation number map according to the first embodiment of the present invention, FIG. 10 is a diagram showing a recommended input shaft rotation number map for a corner according to the first embodiment of the present invention, FIG. 11 is a diagram showing a shifting speed coefficient map that corresponds to the brake pedal depression force according to the first embodiment of the present invention, FIG. 12 is a flowchart showing the operation of the continuously variable transmission control device according to the first embodiment of the present invention, FIG. 13 is a flowchart showing the subroutine of the target input shaft rotation number calculation processing for a corner according to the first embodiment of the present invention, and FIG. 14 is a flowchart showing the subroutine of the shifting control processing according to the first embodiment of the present invention. Further, in FIG. 9, the horizontal axis shows the vehicle speed and the vertical axis shows the fundamental target input shaft rotation number, in FIG. 10, the horizontal axis shows the vehicle speed and the vertical axis shows the recommended input shaft rotation number, and in FIG. 11, the horizontal axis shows the brake pedal depression force and the vertical axis shows the shifting speed coefficient.

First, the continuously variable transmission control device 30 carries out the fundamental target input shaft rotation number calculation processing. In this case, in accordance with the fundamental target input shaft rotation number map as shown in FIG. 9 that is created in advance, based on the vehicle speed and the accelerator opening that is received from the vehicle speed sensor 42 and the accelerator opening sensor 45, the fundamental target input shaft rotation number is calculated.

Here, the map shown in FIG. 9 is one of the shifting maps for the continuously variable transmission 20, and the straight line 16-1 shows the relationship between the input shaft rotation number of the continuously variable transmission 20 and the vehicle speed in a case in which the shift ratio of the continuously variable transmission 20 is set at a maximum, and the straight line 16-2 shows the relationship between the input shaft rotation number of the continuously variable transmission 20 and the vehicle speed in a case in which the shift ratio of the continuously variable transmission 20 is set at a minimum. Further, the vehicle speed is proportionate to the output shaft rotation number of the continuously variable transmission 20.

The curves 17-1 through 17-4 are shifting curves showing the relationship between the input shaft rotation number of the continuously variable transmission 20 that corresponds to the phase of the accelerator opening and the vehicle speed. For example, in a case in which the accelerator opening corresponds to a third phase, the shift ratio of the continuously variable transmission 20 is controlled so that the relationship between the input shaft rotation number and the vehicle speed changes in line with the curve 17-3. Further, the accelerator opening, in actuality, continuously changes without phases. However, the curves 17-1 through 17-4 show the accelerator opening that corresponds to the four phases in the change. It shows that the curve 17-1 corresponds to the first phase at which the accelerator opening is small, and 17-2, 17-3 and 17-4, in that order, correspond to the phases at which the accelerator opening is large.

Next, the continuously variable transmission control device 30 carries out road gradient estimation processing. In this case, the road gradient is estimated based on the accelerator opening, the vehicle speed, and the actual acceleration for the vehicle. In the target input shaft rotation number calculation processing for corners that is described later, the road gradient is used to compensate the target input shaft rotation number for the corners.

Next, the continuously variable transmission control device 30 carries out the target input shaft rotation number calculation processing for the corners. In this case, the continuously variable transmission control device 30 first judges whether the corner control is executed or not as the driving force control, and whether the corner control running flag is on or not. Further, when the vehicle engine is started, the corner control running flag is initialized and turned off.

When the corner control running flag is off in other words, when corner control is not being executed, the continuously variable transmission control device 30 judges whether there is a corner ahead or not, based on whether the information concerning the corner shape included in the running environment information received from the navigation device 10 is on or off. Here, in a case in which the information concerning the corner shape is on, the continuously variable transmission control device 30 judges that there is a corner ahead, and next determines whether the necessary deceleration Gi that is included in the running environment information is equal to or greater than a specified value, in other words, whether or not deceleration for the corner is necessary.

Next, where it is determined that deceleration for the corner is necessary, because the conditions for starting the corner control are satisfied, the continuously variable transmission control device 30 begins the corner control. The corner control running flag that shows that the corner control is being executed is turned on.

Also, as described above, where the corner control running flag is on when the corner control is judged as being executed or not, the continuously variable transmission control device 30 judges whether the corner has been passed or not based on whether the information concerning the corner shape that is included in the running environment information is on or off. In a case in which the information concerning the corner shape is off, the continuously variable transmission control device 30 judges that the corner has been passed, turns the corner control running flag on, and then sets the target input shaft rotation number for the corner to the initial value (zero), and completes the target input shaft rotation number calculation processing for the corner.

Furthermore, as described above, where it is judged that there is no corner because the information concerning the corner shape is off when judging whether there is a corner ahead or not, and in a case in which it is judged that deceleration is not necessary because the necessary deceleration Gi is less than a specified value when judging whether deceleration for the corner is necessary or not, because the condition for starting the corner control are not satisfied, the continuously variable transmission device 30 sets the target input shaft rotation number for the corner to the initial value (zero), and completes the target input shaft rotation number calculation processing for the corner.

Next, the continuously variable transmission control device 30 calculates the recommended input shaft rotation number for the corner based on the information concerning the necessary deceleration and the corner shape that are included in the running environment information received from the navigation device 10, and in accordance with the recommended input as shaft rotation number map for the corner as shown in FIG. 10.

In this case, the recommended input shaft rotation number for the corner is the input shaft rotation number of the continuously variable transmission 20 that is determined by the necessary deceleration, in other words, the degree of necessity for deceleration and the corner shape, and the intention of the driver to decelerate is not reflected in the recommended input shaft rotation number. Further, the target input shaft rotation number does reflect the intention of the driver to decelerate in the recommended input shaft speed for the corner.

Here, the map shown in FIG. 10 is one of the shifting maps of the continuously variable transmission 20, and the straight line 22-1 shows the relationship between the input shaft rotation number of the continuously variable transmission 20 and the vehicle speed in a case in which the shift ratio of the continuously variable transmission 20 is set at a maximum, and the straight line 22-2 shows the relationship between the input shaft rotation number of the continuously variable transmission 20 and the vehicle speed in a case in which the shift ratio of the continuously variable transmission 20 is set at a minimum. Further, the vehicle speed is proportionate to the output shaft rotation number of the continuously variable transmission 20. Also, in FIG. 10, the values shown as the vehicle speed on the horizontal axis and as the recommended input shaft rotation number on the vertical axis are examples, and can be changed as appropriate.

The curves 23-1 through 23-4 are shifting curves that show the relationship between the input shaft rotation number of the continuously variable transmission 20 that corresponds to the phase of the necessary deceleration and the vehicle speed. In this case, as the necessary deceleration increases, the recommended input shaft rotation number increases. Also, in a case in which the vehicle enters a corner at a high speed, and in a case in which the accelerator off is slow, because the necessary deceleration is great, the recommended input shaft rotation number increases. However, because the upper limit value of the recommended input shaft rotation number is set by the corner shape, an extremely high recommended input shaft rotation number is not calculated.

Also, it is desirable for the recommended input shaft rotation number to be compensated by the road gradient. For example, in a case in which the road is a descending road, in other words, a downward slop, it is preferable to further increase the recommended input shaft rotation number by approximately 500 (rpm). Further, it is preferable to calculate the recommended input shaft rotation number for the corner in accordance with the map as shown in FIG. 10, and to set the upper limit value of the recommended input shaft rotation number for the corner according to the corner shape (gentle corner, moderate corner and sharp corner).

Next, the continuously variable transmission control device 30 judges whether it is an idling state or not based on the accelerator opening, in other words, whether the driver has completely closed the accelerator or not. Here, in an idling state, in other words, when the driver has completely closed the accelerator, it can be judged that the driver intends to decelerate. In a case in which it is judged that the driver intends to decelerate, the continuously variable transmission control device 30 substitutes the target input shaft rotation number for the corner with the recommended input shaft rotation number that is calculated in accordance with the recommended input shaft rotation number map for the corner.

Meanwhile, where it is judged that it is not an idle state and the driver does not intend to decelerate, the continuously variable transmission control device 30 compares the actual input shaft rotation number of the continuously variable transmission 20 at this time, in other words, the actual input shaft rotation number and the recommended input shaft rotation number that is calculated, and judges whether or not the actual input shaft rotation number is equal to or less than the recommended input shaft rotation number. When the actual input shaft rotation number is equal to or less than the recommended input shaft rotation number, in order that the input shaft rotation number of the continuously variable transmission 20 does not become less than the actual input shaft rotation number at this time, the continuously variable transmission control device 30 substitutes the target input shaft rotation number for the corner with the actual input shaft rotation number.

Furthermore, in a case where the actual input shaft rotation number is greater than the recommended input shaft rotation number, the continuously variable transmission device 30 substitutes the target input shaft rotation number for the corner with the recommended input rotation number. In this case, because the actual input shaft rotation number is already larger than the target input shaft rotation number, and the shifting operation is not involved, the driver does not experience a feeling of discomfort.

Next, the continuously variable transmission control device 30 carries out the final target input shaft rotation number calculation processing. In this case, the continuously variable transmission control device 30 compares the fundamental target input shaft rotation number that has already been calculated and the target input shaft rotation number for the corner, and sets the one with the higher rotation number as the final target input shaft rotation number. Here, if the fundamental target input shaft rotation number is set as NIN_BASE, the target input shaft rotation number for the corner is NIN_CN, and the final target input shaft rotation number is NIN_F, it is expressed using the following equation (2).

$$NIN\_F = MAX(NIN\_BASW, NIN\_CN) \qquad \text{Equation (2)}$$

Where the MAX (A and B) is the function that selects the maximum value of A and B.

Further, in a case in which corner control is not executed, because the target input shaft rotation number for the corner (NIN_CN) is the initial value (zero), if the maximum value is selected as in equation (2), the final target input shaft rotation number (NIN_F) inevitably becomes the fundamental target input shaft rotation number (NIN_BASE), and normal control is executed.

Next, the continuously variable transmission control device 30 carries out shift control processing. In this case, in order to change the shifting speed during corner control and during normal control, the continuously variable transmission control device 30 first references the corner control running flag and judges whether corner control is being executed or whether normal control is being executed at this time depending on whether or not the corner control running flag is on. In a case in which it is judged that corner control is being executed at this time, the continuously variable transmission control device 30 compares the final target input shaft rotation number and the transitional target input shaft rotation number. Also, even in a case in which it is judged that corner control is not being executed at present because the corner control running flag is off, if it is immediately after the corner control running flag is set from on to off, upshifting for returning from the corner control to normal control is implemented at a shifting speed that is different from the shifting speed during normal control. Therefore, the subroutine proceeds to the processing that is the same as for a case in which corner control is executed. Consequently, even if normal control is executed at this time, in a case in which it is judged to be within a specified time after the corner control running flag is set from on to off, the continuously variable transmission control device 30 compares the final target input shaft rotation number and the transitional target input shaft rotation number.

Meanwhile, in a case in which the normal control is being executed at this time and it is judged that a specified time has passed after the corner control running flag is set from on to off, the continuously variable transmission control device 30 calculates the shifting speed coefficient for the transitional target input shaft rotation number calculation in normal control. Here, the transitional target input shaft rotation number is the transitional target value that allows the actual input shaft rotation number to smoothly track the final target input shaft rotation number, and each actuator of the continuously variable transmission 20 is controlled based on this value. Also, during normal control, the shifting speed coefficient according to the accelerator opening and the vehicle speed is calculated in accordance with a specified map. Further, the larger the accelerator opening and the lower the vehicle speed, the shifting speed coefficient is set larger, and accordingly the shifting speed becomes faster. The shifting speed coefficient that is calculated is used when the transitional target input rotation number is calculated.

Also, in a case in which the comparison of the final target input shaft rotation number and the transitional target input shaft rotation number is conducted, and the final target input shaft rotation number is larger than the transitional target input shaft rotation number, the continuously variable transmission control device 30 judges that downshifting is to be implemented. Meanwhile, in a case in which the final target input shaft rotation number is equal to or less than the transitional target input shaft rotation number, the continuously variable transmission control device 30 judges that upshifting is to be implemented. This is because the shifting speed for corner control is individually set for when downshifting and for when upshifting.

Next, in a case in which it is judged that downshifting is to be implemented, the continuously variable transmission control device 30 judges whether or not downshifting has already been implemented in the corner control. This is because the shifting speed in the corner control changes when the downshifting has been implemented and when it has not been implemented. Here, in a case in which both the following conditions are satisfied, downshifting is judged as having been implemented in the corner control.

|Final target input shaft rotation number−fundamental target input shaft rotation number|>specified value 1

|Final target input shaft rotation number−transitional target input shaft rotation number|<specified value 2

Next, in a case in which it is judged that downshifting has not been implemented in the corner control, the continuously variable transmission control device 30 calculates the shifting speed coefficient for the transitional target input shaft rotation number that corresponds to the brake pedal depression force, in accordance with the curve 24-1 in the shifting speed coefficient map that corresponds to the brake pedal depression force shown in FIG. 11. Further, the map shown in FIG. 11 is created in advance in order to determine the relationship between the shifting speed coefficient that determines the shifting speed of the continuously variable transmission 20 and the brake pedal depression force, and is stored in the memory unit. The curve 24-1 shows the relationship between the shifting speed coefficient and the brake pedal depression force in a case in which downshifting has not been implemented in the corner control, and the curve 24-2 shows the relationship between the shifting speed coefficient and the brake pedal depression force in a case in which downshifting has been implemented in the corner control. In this case, because it can be thought that the larger the brake pedal depression force, the greater the intention of the driver to decelerate, the shifting speed coefficient is set at a large value, and the shifting speed becomes faster. Further, the shifting speed coefficient may be calculated using a specified calculation formula based on the brake pedal depression force, the vehicle characteristics, the running environment, and various types of state quantities that express the running state. The shifting speed coefficient that is calculated is used when calculating the transitional target input shaft rotation number.

Also, in a case in which it is judged that downshifting has been implemented in the corner control, the continuously variable transmission control device 30 calculates the shifting speed coefficient for the transitional target input shaft rotation number calculation that corresponds to the brake pedal depression force in accordance with the curve 24-2 in the shifting speed map that corresponds to the brake pedal depression force shown in FIG. 11. In this case as well, as in a case in which downshifting is not implemented, it can be thought that the larger the brake pedal depression force, the greater the intention of the driver to decelerate. Therefore, the shifting speed coefficient is set at a large value, and the shifting speed becomes faster.

Here, as is apparent from the comparison between the curve 24-2 and the curve 24-1, the shifting speed coefficient in a case in which downshifting is executed in the corner control is set so as to be smaller than the shifting speed coefficient in a case in which downshifting is not executed, and the shifting speed of the continuously variable transmission 20 is slowed down. The reason is that, in a case in which downshifting is not executed, it can be assumed that the vehicle will be entering a corner from a state in which it is moving straight, and therefore it is necessary to increase the shifting speed when downshifting in order to quickly effect the engine brake. On the other hand, in a case in which downshifting is implemented, it can be assumed that the vehicle is already running in the corner at present, and, further, is entering the next corner. Therefore, it is necessary to slow down the shifting speed when downshifting in order to prevent a feeling of discomfort due to the sudden shifting when running through consecutive corners.

Further, the shifting speed coefficient may be calculated using a specified calculation method based on the brake pedal depression force, the vehicle characteristics, the running environment, and the quantity of each type of state that expresses the running state. The shifting speed coefficient that is calculated is used when calculating the transitional target input shaft rotation number.

Also, as described above, in a case in which it is judged that upshifting is to be implemented because the final target input shaft rotation number is equal to or less than the transitional target input shaft rotation number, the continuously variable transmission control device 30 calculates the shifting speed coefficient for the transitional target input shaft rotation number calculation when upshifting in the corner control. When upshifting in the corner control, because the shifting speed is slowed and upshifting is performed slowly so that the driver does not experience a feeling of discomfort, the shifting speed coefficient is set at a smaller value compared to the shifting speed coefficient in the normal control and when downshifting in the corner control. Further, the shifting speed coefficient that is calculated is used when calculating the transitional target input shaft rotation number.

Next, in order that the actual input shaft rotation number smoothly comes near to the final target input shaft rotation number that was calculated, using the shifting speed coefficient that was calculated, the continuously variable transmission control device 30 calculates the transitional target input shaft rotation number with the next equation (3).

$$NINTSTA(i)=NINTSTA(i-1)+KNIN1\times(NIN\_F(i)-NINTSTA(i-1))+KNIN2 \quad (3)$$

In the equation, NINTSTA (i) is the present transitional target input shaft rotation number, NINTSTA (i−1) is the previous transitional target input shaft rotation number, KNIN1 is the shifting speed coefficient (the larger it is, the faster the shifting speed), NIN_F (i) is the present final target input shaft rotation number, and KNIN2 is the minimum shifting speed.

Here, the minimum shifting speed (KNIN2) is set in order to prevent the rotation difference (final target input shaft rotation number−transitional target input shaft rotation number) from becoming small, and to prevent the shifting speed from becoming too slow. In other words, if the minimum shifting speed (KNIN2) is not set, the slope of the curve that shows the transitional target input rotation number becomes more gentle as the target value is approached, and it takes time until the target values is reached. Therefore, the minimum shifting speed (KNIN2), which has a great effect when the transitional target input shaft rotation number approaches the target value, is set. Consequently, the minimum shifting speed (KNIN2) is set so that it becomes a positive value when downshifting and a negative value when upshifting. Also, although the minimum shifting speed (KNIN2) is a constant, it may be changed as appropriate in accordance with the vehicle characteristics, running state and running environment.

Moreover, the transitional target input shaft rotation number can also be calculated using the next equation (4).

$$NINTSTA(i)=NINTSTA(i-1)+KNIN\_SWP \quad (4)$$

In the equation, NINTSTA (i) is the present transitional target input shaft rotation number, NINTSTA (i−1) is the previous transitional target input shaft rotation number, and KNIN_SWP is the amount of change per control cycle.

In this case, the continuously variable transmission control device 30, in the shift control processing, calculates the amount of change per control cycle (KNIN_SWP) rather than calculate the shifting speed coefficient. Here, the amount of change per control cycle (KNIN_SWP)) is the value for the transitional target input shaft rotation number that increases or decreases for each one cycle. Therefore, the amount of change per control cycle (KNIN_SWP) is set so that it becomes a positive value when downshifting and a negative value when upshifting. The size of the amount of change per control cycle (KNIN_SWP), as described before, is set in the same manner as in a case in which the shifting speed coefficient is calculated. In other words, under conditions in which the shifting speed coefficient is set to a large value, the amount of change per control cycle (KNIN_SWP) is set to a large value, and under conditions in which the shifting speed coefficient is set to a small value, the amount of change per control cycle (KNIN_SWP) is set to a small value. Thus, the transitional target input shaft rotation number can be calculated in the same manner as in a case in which the shifting speed coefficient is calculated.

Finally, the continuously variable transmission control device 30 operates the actuator of the continuously variable transmission 20 and controls the shift ratio so that the actual input shaft rotation number matches the transitional target input shaft rotation number that was calculated. Thus, for example, in a case in which the continuously variable transmission 20 is a belt-type continuously variable transmission, each movable sheave for adjusting the distance between the inclined sides of the V-pulleys is moved in the direction of the shaft, and the shift ratio is changed.

Further, the fundamental target input shaft rotation number calculation processing, the road gradient estimation processing, the target input shaft rotation number calculation processing for the corner, the final target input shaft rotation number calculation processing and the shift control processing that are implemented by the continuously variable transmission control device 30 are repeatedly implemented at specified cycles (for example, 16 (msec)).

Next, the flowchart will be explained. First, the flowchart in FIG. 12 that shows the overall processing in the continuously variable transmission control device 30 will be explained.

A driving force control apparatus for a vehicle includes an accelerator opening sensor that detects accelerator opening for a vehicle, and an automatic transmission control device that controls an automatic transmission based on road information and the accelerator opening. The automatic transmission control device, in an interval prior to a deceleration required interval, controls an automatic transmission so as to ease a shifting operation that corresponds to a decrease in the accelerator opening.

A driving force control apparatus for a vehicle includes an accelerator opening sensor that detects accelerator opening for a vehicle, and an automatic transmission control device that controls an automatic transmission based on road information and the accelerator opening. The automatic transmission control device, in an interval prior to a deceleration required interval, controls an automatic transmission so as to ease a shifting operation that corresponds to a decrease in the accelerator opening.

Step S11 Fundamental target input shaft rotation number calculation processing is executed.

Step S12 Road gradient estimation processing is executed.

Step S13 Target input shaft rotation number calculation processing for a corner is executed.

Step S14 Final target input shaft rotation number calculation processing is executed.

Step S15 Shift control processing is executed.

Next, the flowchart that shows the subroutine of the target input shaft rotation number calculation processing for a corner according to the first embodiment of the present invention will be explained.

Step S13-1 It is judged whether or not the corner control running flag is on. If it is on, then the subroutine proceeds to step S13-2, and if it is not on, then the subroutine proceeds to step S13-5.

Step 13-2 It is judged whether or not the corner has been passed. If it has been passed, then the subroutine proceeds to step S13-3, and if it has not been passed then the subroutine proceeds to step S13-9.

Step S13-3 The corner control running flag is set to off.

Step S13-4 The target input shaft rotation number for a corner is set to the initial value (zero) and the subroutine returns.

Step S13-5 It is judged whether or not there is a corner ahead. If there is a corner, then the subroutine proceeds to step S13-6, and if there is no corner, then the subroutine proceeds to step S13-7.

Step S13-6 It is judged whether or not the necessary deceleration Gi is equal to or greater than a specified value. If it is equal to or greater than a specified value, then the subroutine proceeds to step S13-8, and if it is less than a specified value, then the subroutine proceeds to step S13-7.

Step S13-7 The target input shaft rotation number for a corner is set to the initial value (zero) and the subroutine returns.

Step S13-8 The corner control running flag is set to on.

Step S13-9 The recommended input shaft rotation number for a corner that corresponds to the necessary deceleration and the corner shape is calculated.

Step S13-10 It is judge whether or not it is an idling state. If it is an idling state, then the subroutine proceeds to step S13-11, and if it is not an idling state, then the subroutine proceeds to step S13-12.

Step S13-11 The recommended input shaft rotation number for a corner is substituted for the target input shaft rotation number for a corner and the subroutine returns.

Step S13-12 It is judged whether or not the actual input shaft rotation number is equal to or less than the recommended input shaft rotation number for a corner. If the actual input shaft rotation number is equal to or less than the recommended input shaft rotation number for a corner, then the subroutine proceeds to step S13-13, and if the actual input shaft rotation number is greater than the recommended input shaft rotation number, then the subroutine proceeds to step S13-14.

Step S13-13 The actual input shaft rotation number is substituted for the target input shaft rotation number for a corner and the subroutine returns.

Step S13-14 The recommended input shaft rotation number is substituted for the target input shaft rotation number and the subroutine returns.

Next, the flowchart that shows the subroutine of the shift control processing according to the first embodiment of the present invention will be explained.

Step S15-1 It is judged whether or not the corner control running flag is on, and whether it is within a specified time after the corner control running flag changes from on to off. If the corner control running flag is on, or if it is within a specified time after changing from on to off, then the subroutine proceeds to step S15-3, and if the corner control running flag is off, or if it is equal to or more than a specified time after changing from on to off, then the subroutine proceeds to step S15-2.

Step S15-2 The shifting speed coefficient for the transitional target input shaft rotation number during normal control is calculated.

Step S15-3 It is judged whether or not the final target input shaft rotation number is greater than the transitional target input shaft rotation number. If the final target input shaft rotation number is greater than the transitional target input shaft rotation number, then proceed to step S15-4, and if the final target input shaft rotation number is equal to or less than the transitional target input shaft rotation number, then the subroutine proceeds to step S15-7.

Step S15-4 It is judged whether or not downshifting is implemented by the corner control. If it is implemented, then the subroutine proceeds to step S15-6, and if it is not implemented, then the subroutine proceeds to step S15-5.

Step S15-5 The shifting speed coefficient for the transitional target input shaft rotation number calculation is calculated in response to the brake pedal depression force in accordance with the shifting speed coefficient map when downshifting is not implemented for the corner control shown in FIG. 11.

Step S15-6 The shifting speed coefficient for the transitional target input shaft rotation number calculation is calculated in response to the brake pedal depression force in accordance with the shifting speed coefficient map when downshifting is implemented for the corner control shown in FIG. 11.

Step S15-7 The shifting speed coefficient for the transitional target input shaft rotation number calculation during upshifting for the corner control is calculated.

Step S15-8 The transitional target input shaft rotation number is calculated using the shifting speed coefficient that was calculated.

Step S15-9 The shift ratio is changed and returned so that the actual input shaft rotation number matches the transitional target input shaft rotation number.

Next, the operation of the driving force control apparatus for a vehicle when the vehicle approaches a corner will be explained.

Figure 1:
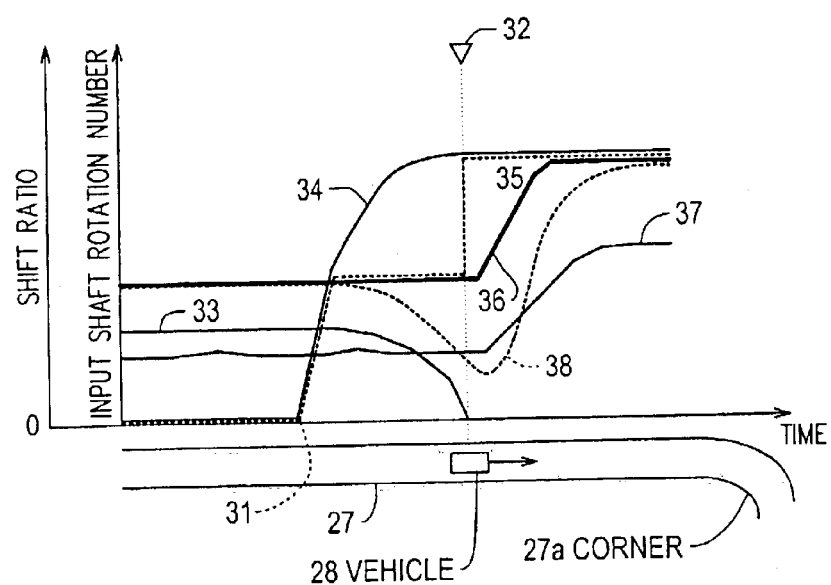
FIG. 1 is a diagram schematically showing a state of corner control in which an accelerator opening is relatively small according to a first embodiment of the present invention.
Figure 15:
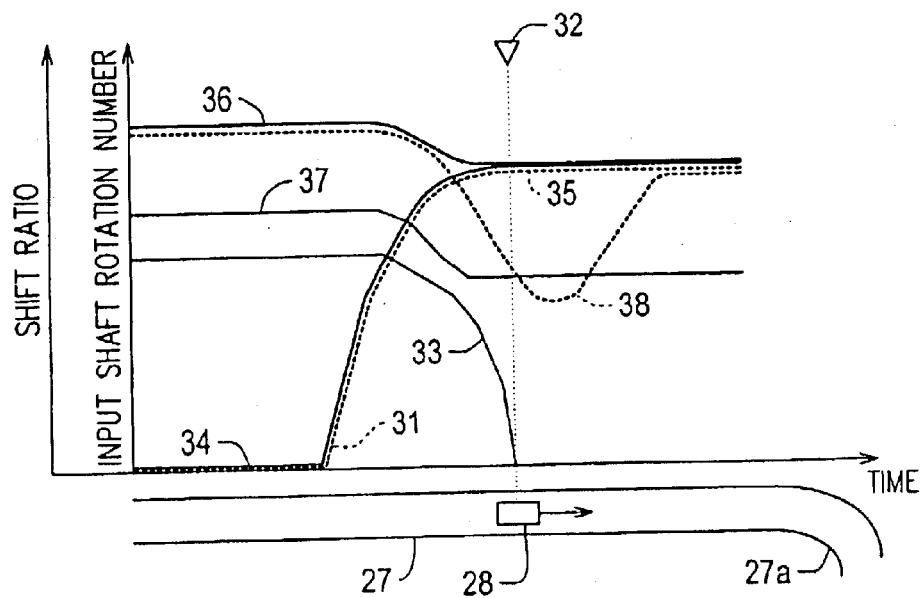
FIG. 15 is a diagram showing a state of corner control in a case in which the accelerator opening is relatively large according to the first embodiment of the present invention.

FIG. 1 is a diagram showing the state of the corner control where the accelerator opening is relatively small according to the first embodiment of the present invention, and FIG. 15 is a diagram showing the state of the corner control in a case in which the accelerator opening is relatively large according to the first embodiment of the present invention. Further, in the diagrams, the horizontal axis shows time and the vertical axis shows shift ratio and the input shaft rotation number.

In FIG. 1, a reference numeral 27 denotes a road, a reference numeral 28 denotes a vehicle running on the road 27, and the progress of the position for the vehicle 28 on the road 27 substantially corresponds to the progress of time on the horizontal axis of the graph. Further, a reference numeral 27a denotes a corner that is the deceleration required interval.

Also, in the graph, a reference numeral 31 denotes a corner control starting point where the corner control is started as the driving force control for the vehicle 28, a reference numeral 32 denotes an idling state starting point where the accelerator is completely closed for the corner 27a, a reference numeral 33 denotes an accelerator opening curve showing the change in the accelerator opening, a reference numeral 34 denotes a recommended input shaft rotation number curve showing the change in the recommended input shaft rotation number, a reference numeral 35 denotes a target input shaft rotation number curve showing the change in the target input shaft rotation number, a reference numeral 36 denotes a transitional target input shaft rotation number curve showing the change in the transitional target input shaft rotation number, a reference numeral 37 denotes a shift ratio curve showing the change in the shift ratio of the continuously variable transmission 20, and a reference numeral 38 denotes a conventional transitional target input shaft rotation number curve showing the conventional transitional target input shaft rotation number. Further, as described before, because the shift ratio of the continuously variable transmission 20 is controlled so that the actual input shaft rotation number matches the transitional target input shaft rotation number that was calculated, it can be said that the transitional target input shaft rotation number curve 36 shows the change in the actual input shaft rotation number of the continuously variable transmission 20.

In FIG. 1, a case in which the vehicle 28 is entering the interval prior to the corner 27a in a state in which the accelerator opening is relatively small is shown. Here, when the vehicle 28 enters the interval, the navigation device 10 judges that the vehicle 28 will come near the corner 27a, and begins the running environment identification processing (step S2). As a result, the running environment information including the corner shape and the necessary deceleration are transmitted to the continuously variable transmission control device 30 (step S3). The continuously variable transmission control device 30 judges that the necessary deceleration is equal to or greater than a specified value when the vehicle 28 reaches a position that corresponds to a corner control start point 31, and begins corner control (step S13-8). Next, the calculation of the recommended input shaft rotation number and the target input shaft rotation number for the corner 27a is started (step S13-9).

In this case, as the vehicle 28 approaches the corner 27a, the necessary deceleration increases. Therefore, the recommended input shaft rotation number increases as shown by the recommended input shaft rotation number curve 34. Because the recommended input shaft rotation number is substituted for the target input shaft rotation number at this phase, the target input shaft rotation number curve 35 overlaps the recommended input shaft rotation number curve 34 (step S13-14). If the recommended input shaft rotation number becomes larger than the actual input shaft rotation number that is shown by the transitional target input shaft rotation number curve 36, because the actual input shaft rotation number is substituted for the target input shaft rotation number, the target input shaft rotation number curve 35 overlaps the transitional target input shaft rotation number curve 36 (step S13-13).

Meanwhile, the driver for the vehicle 28 decelerates the vehicle as the vehicle 28 approaches the corner 27a, and returns the accelerator as shown by the accelerator opening curve 33.

In the case of the conventional driving force control apparatus for a vehicle described before, if it is detected that the accelerator has been returned, as shown by the conventional transitional target input shaft rotation number curve 38, the transitional target input shaft rotation number decreases. Therefore, the driver experiences a sensation of idle running because the shift ratio becomes smaller, upshifting is executed, and the deceleration force becomes smaller due to the engine brake.

However, according to the embodiment, because the corner control is started, while the accelerator is being returned, the target input shaft rotation number 35 overlaps the transitional target input shaft rotation number curve 36 and does not change, the transitional target input shaft rotation number does not decrease. Therefore, the shift ratio is substantially constant, and upshifting is not executed. In other words, because upshifting is prohibited, the deceleration force due to engine braking does not become small, and the driver does not experience a feeling of discomfort.

Next, in the idling state starting point 32, if the accelerator is fully returned and completely closed, because the recommended input rotation number is substituted for the target input shaft rotation number, the target input shaft rotation number curve 35 overlaps the recommended input shaft rotation number curve 34 (step S13-11). Therefore, because the target input rotation number becomes greater than the transitional target input shaft rotation number, the transitional target input shaft rotation number is calculated so that the actual input shaft rotation number smoothly comes near to the target input shaft rotation number (step S15-8). Thus, the transitional target input shaft rotation number increases as shown by the transitional target input shaft rotation number curve 36.

In this case, because it can be thought that the larger the brake pedal depression force the greater the intention of the driver to decelerate, the shifting speed coefficient is set at a large value, and the slope of the transitional target input shaft rotation number curve 36 becomes sharp so that the shifting speed becomes faster (step S15-15). Further, when the vehicle 28 is passing another corner at this time, it is necessary to slow down the shifting speed of the downshifting in order to prevent a feeling of discomfort due to sudden shifting when running through consecutive corners. Therefore, the shifting speed coefficient is set at a small value (step S15-6).

Next, because the shift ratio of the continuously variable transmission 20 is controlled so that the actual input shaft rotation number matches the transitional target input shaft rotation number that was calculated, it changes as shown by the shift ratio curve 37 (Step S15-19). In this case, the shift ratio is substantially constant from when the vehicle 28 enters the interval prior to the corner 27a until reaching the idling state start point 32, and smoothly increases after passing the idling state start point 32, and smooth downshifting is executed. Consequently, it is apparent that unnecessary upshifting is not executed and busy-shifting does not occur, and driving force control that coincides with the accelerator operations by the driver is executed.

In contrast, when the conventional driving force control apparatus for a vehicle, as shown by the conventional transitional target input shaft rotation number curve 38, after the vehicle 28 passes the idling state starting point 32, the transitional target input shaft rotation number rapidly increases. In this case, the shift ratio also rapidly increases along with the transitional target input shaft rotation number, and rapid downshifting is executed. Therefore, the deceleration force due to engine braking rapidly increases, and the driver experiences a feeling of discomfort. Moreover, as described above, because rapid downshifting is executed directly after upshifting is executed when the accelerator is being returned, busy-shifting occurs, and the driving force for the vehicle fluctuates, and accordingly, the driver experiences a feeling of discomfort. Therefore, driving force control that coincides with the senses of the driver cannot be conducted, and vehicle drivability worsens.

Thus, according to the embodiment, unnecessary upshifting is not executed and busy-shifting does not occur, and driving force control that coincides with the senses of the driver is executed.

Next, the state of the corner control in a case in which the accelerator opening is relatively large will be explained.

In FIG. 15, shows when the vehicle 28 is entering the interval prior to the corner 27a in a state in which the accelerator opening is relatively large. Here, when the vehicle 28 approaches the interval, the navigation device 10 judges that the vehicle 28 will come near to the corner 27a, and begins the running environment identification processing (step S2). As a result, the running environment information including the corner shape and the necessary deceleration are transmitted to the continuously variable transmission control device 30 (step S3). The continuously variable transmission control device 30 judges that the necessary deceleration is equal to or greater than a specified value when the vehicle 28 reaches a position that corresponds to a corner control start point 31, and begins corner control (step S13-8). Next, the calculation of the recommended input shaft rotation number and the target input shaft rotation number for the corner 27a is started (step S13-9).

In this case, as the vehicle 28 approaches the corner 27a, the necessary deceleration increases. Therefore, the recommended input shaft rotation number increases as shown by the recommended input shaft rotation number curve 34. Because the recommended input shaft rotation number is substituted for the target input shaft rotation number at this phase, the target input shaft rotation number curve 35 overlaps the recommended input shaft rotation number curve 34 (step S13-14). Here, because the accelerator opening is relatively large, the actual input shaft rotation number shown by the transitional target input shaft rotation number curve 36 becomes rather large. Therefore, the actual input shaft rotation number shown by the transitional target input rotation number curve 36 does not become smaller than the recommended input shaft rotation number.

Meanwhile, as the vehicle 28 approaches the corner 27a, the driver for the vehicle 28 returns the accelerator in order to decelerate the vehicle, as shown by the accelerator opening curve 33. In this case, the shift ratio is substantially constant and upshifting is not executed in a state in which the accelerator opening as shown in FIG. 1 is relatively small. However, in FIG. 15, the accelerator opening is relatively large, and the transitional target input shaft rotation number that corresponds to the actual input shaft rotation number is larger than the final target input shaft rotation number that corresponds to the corner 27a (step 15-3). Therefore, the continuously variable transmission control device 30 calculates the shifting speed coefficient for the transitional target input shaft rotation calculation when upshifting in the corner control (step S15-7). Further, when upshifting in the corner control, the shifting speed is slowed down and upshifting is executed so that the driver does not experience a feeling of discomfort. Therefore, the shifting speed coefficient is set at a smaller value compared to the shifting speed coefficient during normal control and when downshifting in the corner control (step S15-7). Next, the transitional target input shaft rotation number is calculated so that the actual input shaft rotational speed smoothly comes near to the final target input rotation number (step S15-8). In this case, because the actual input shaft rotation number is decreased and comes near to the final target input shaft rotation number, the transitional target input shaft rotation number decreases as shown by the transitional target input shaft rotation number curve 36. Therefore, the shift ratio of the continuously variable transmission 20 gently decreases as shown by the shift ratio curve 37, and upshifting is slowly executed.

Then, in the idling state starting point 32, even if the accelerator is fully returned and completely closed, the state in which the recommended input shaft rotation number is substituted for the target input shaft rotation number is continued in the same manner (step S13-11). In this case, because the actual input shaft rotation number has already been controlled so as to smoothly come near to the final target input shaft rotation number, and matches the target input shaft rotation number, it is substantially constant as shown by the transitional target input shaft rotation number curve 36. Then, because the shift ratio of the continuously variable transmission 20 is controlled so that the actual input shaft rotation number matches the transitional target input shaft rotation number that was calculated, it is substantially constant as shown by the shift ratio curve 37 (step S15-9).

In this manner, in a case in which the vehicle 28 enters the interval prior to the corner 27a in a state in which the accelerator opening is relatively large, in correspondence to the returning of the accelerator by the driver for the vehicle 28, the transitional target input shaft rotation number is gently lowered and matches the final target input shaft rotation number. Therefore, the shift ratio of the continuously variable transmission 20 slowly decreases, in other words, upshifting is slowly executed, and it is substantially constant after reaching the value that corresponds to the final target input shaft rotation number. Consequently, because shifting is smoothly conducted, driving force smoothly fluctuates and deceleration force due to engine braking corresponding to the corner can be obtained, driving force control that coincides with the accelerator operations by the driver can be executed, and the drivability for the vehicle 28 can be improved.

In contrast, in the case of the conventional driving force control apparatus for a vehicle, as shown by the conventional transitional target input shaft rotation number curve 38, if it is detected that the accelerator has been returned, the conventional transitional target input shaft rotation number rapidly decreases to a large extent. Then, after the vehicle 28 passes the idling state starting point 32, the conventional transitional target input shaft rotation number increases. In this case, the shift ratio rapidly decreases to a large extent along with the conventional transitional target input shaft rotation number, and upshifting is rapidly and extensively executed. Therefore, deceleration force due to the engine braking rapidly decreases to a large extent, and the driver experiences a feeling of discomfort. Moreover, because downshifting is executed directly thereafter, busy shifting occurs, and because the driving force for the vehicle 28 fluctuates, the driver experiences a feeling of discomfort. Therefore, driving force control that coincides with the accelerator operations by the driver cannot be executed, and the drivability for the vehicle 28 worsens.

In this manner, according to the embodiment, in the interval prior to the corner 27a, if the driver for the vehicle 28 returns the accelerator from a state in which the accelerator opening is relatively small and completely closes the accelerator, the continuously variable transmission 20 is controlled so that the shift ratio does not change until the accelerator completely closes, and after the accelerator has completely closed, the shift ratio increases. Also, if the driver returns the accelerator from a state in which the accelerator opening is relatively large and completely closes the accelerator, the continuously variable transmission 20 is controlled so that the shift ratio gently decreases until the accelerator is completely closed, and after the accelerator has completely closed, the shift ratio is substantially constant. In other words, the continuously variable transmission is controlled so that the shifting operation that corresponds to the decrease in the accelerator opening is eased.

Therefore, because the shifting of the continuously variable transmission 20 is smoothly conducted, the driving force smoothly fluctuates and the deceleration force due to the engine braking corresponding to the corner can be obtained, unnecessary upshifting is not executed and busy-shifting does not occur, driving force control that coincides with the accelerator operations by the driver can be executed, and the drivability for the vehicle 28 can be improved.

Next, a second embodiment of the present invention will be explained. Further, because the structure of the driving force control apparatus for the vehicle according to the second embodiment is the same as the structure of the driving force control apparatus for the vehicle according to the first apparatus, it will be explained using FIG. 2. Also, because the operation of the navigation device 10 according to the embodiment is the same as the operation of the navigation device 10 according to the first embodiment, the explanation will be omitted. Further, the operation of the continuously variable transmission control device 30 according to the embodiment is substantially the same as the operation of the continuously variable transmission control device 30. However, because a portion of the target input shaft rotation number calculation processing for a corner and a portion of the shift control processing are different, here, a portion of the target input shaft rotation number calculation processing and a portion of the shift control processing will be explained.

Figure 16:
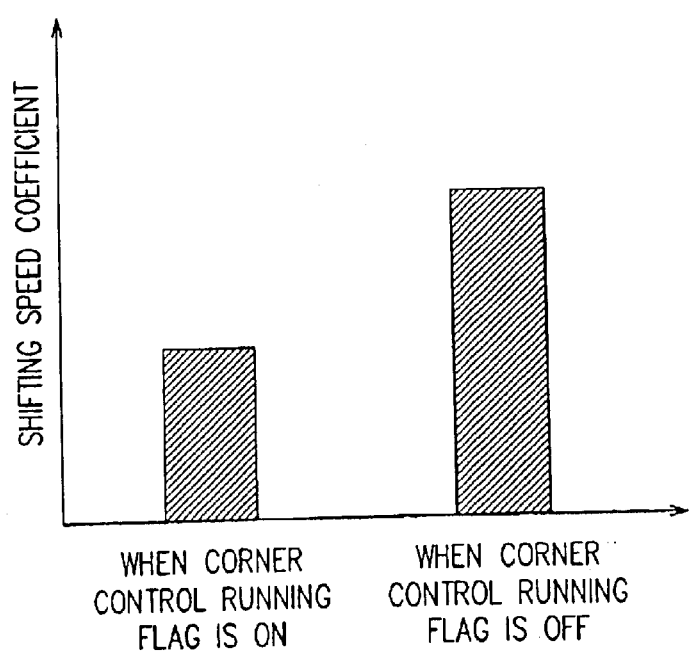
FIG. 16 is a diagram showing a shifting speed coefficient for corner control at a time of upshifting according to a second embodiment of the present invention.
Figure 17:
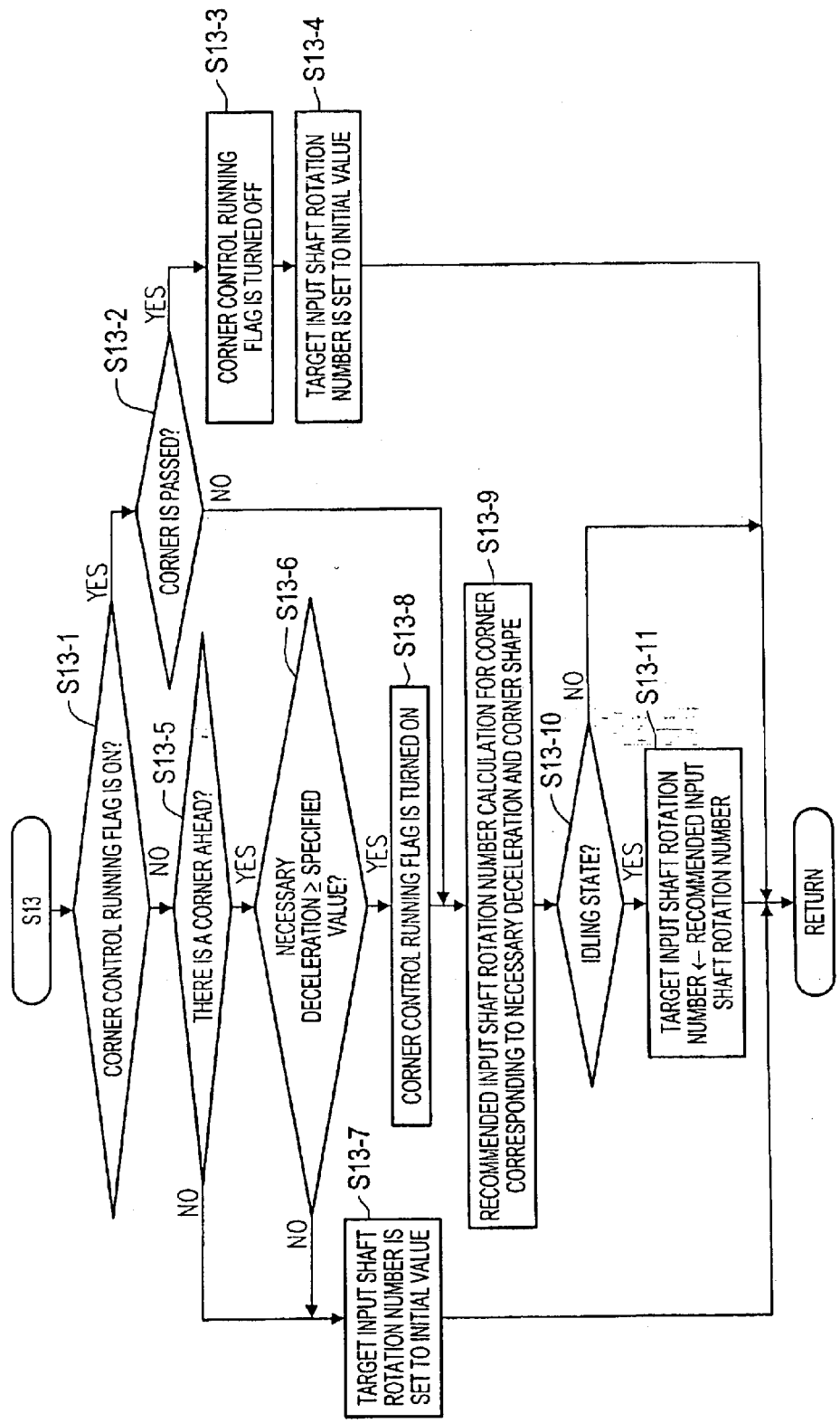
FIG. 17 is a flowchart showing a subroutine for target input shaft rotation number calculation processing for a corner according to a second embodiment of the present invention.

FIG. 16 is a diagram showing the shifting speed coefficient when upshifting in the corner control according to the second embodiment of the present invention, and FIG. 17 is a flowchart showing the subroutine of the target input shaft rotation number calculation processing according to the second embodiment of the present invention.

According to the embodiment, the variable transmission control device 30 executes the target input shaft rotation number calculation processing for a corner as in the first embodiment. Here, the continuously variable transmission control device 30 judges whether or not it is an idling state, in other words, whether or not the driver has completely closed the accelerator based on the accelerator opening, as in the first embodiment. If it is judged that it is an idling state, because the continuously variable transmission control device 30 carries out operation as in the first embodiment, the explanation is omitted.

Meanwhile, if it is judged that it is not an idling state, the target input shaft rotation number calculation processing is completed without updating the target input shaft rotation number. Further, the upshifting prohibition processing that is implemented in the first embodiment is not implemented in this embodiment.

Next, the continuously variable transmission control device 30 implements the shift control processing, as in the first embodiment. Here, as in the first embodiment, the continuously variable transmission control device 30 compares the final target input shaft rotation number and the transitional target input shaft rotation number. In a case in which the final target input shaft rotation number is larger than the transitional target input rotation number, it judges to implement downshifting, and in a case in which the final target input rotation number is equal to or less than the transition target input shaft rotation number, it judges that upshifting is to be implemented. In a case in which it is judged that downshifting is to be implemented, because the continuously variable transmission control device 30 carries out operation as in the first embodiment, the explanation is omitted.

Meanwhile, if it is judged that upshifting is to be implemented, the continuously variable transmission control device 30 references the corner control running flag, and if the corner control running flag is on, it judges that corner control is running, and it sets the shifting speed coefficient to a small value as shown in FIG. 16. Thus, even if upshifting is executed in response to the returning of the accelerator by the driver in the interval prior to a corner, the speed at which the shift ratio changes can be suppressed. Also, in a case in which the corner control running flag is off, the continuously variable transmission control device 30 judges that the corner has been passed, and as shown in FIG. 16, it sets the shifting speed coefficient to a larger value. Thus, if upshifting is executed in response to the returning of the accelerator by the driver after passing the corner, the speed at which the shift ratio changes can be increased, and normal control can be quickly returned.

In such a manner, according to the embodiment, the control algorithm of the continuously variable transmission control device 30 is simplified.

Next, the flowchart will be explained. Further, in the flowchart shown in FIG. 17, steps S13-12 through S13-14 are omitted from the flowchart shown in FIG. 13 according to the first present invention.

Step S13-1 It is judged whether or not the corner control running flag is on. If the flag is on, then the subroutine proceeds to step S13-2, if the flag is off, then the subroutine proceeds to step S13-5.

Step S13-2 It is judged whether or not a corner is passed. If a corner is passed, then the subroutine proceeds to step S13-3, if a corner is not passed, then the subroutine proceeds to step S13-9.

Step S13-3 The corner control running flag is turned off.

Step S13-4 The target input shaft rotation number for a corner is set to the initial value (zero), and the subroutine returns.

Step S13-5 It is judged whether or not there is a corner ahead. If there is a corner, then the subroutine proceeds to step S13-6, if there is not a corner, the subroutine proceeds to step S13-7.

Step S13-6 It is judged whether or not the necessary deceleration Gi is equal to or greater than a specified value. If it is equal to or greater than a specified value, then the subroutine proceeds to step S13-8, if it is less than a specified value, then the subroutine proceeds to step S13-7.

Step S13-7 The target input shaft rotation number for a corner is set to the initial value (zero), and the subroutine returns.

Step S13-8 The corner control running flag is turned on.

Step S13-9 The recommended input shaft rotation number for a corner corresponding to the necessary deceleration and the corner shape is calculated.

Step S13-10 It is judged whether or not it is an idling state. If it is an idling state, then the subroutine proceeds to step S13-11, if it is not an idling state, the subroutine returns.

Step S13-11 The target input shaft rotation number for a corner is substituted for the recommended input shaft rotation number for a corner, and the subroutine returns.

Next, the operation of the driving force control apparatus for a vehicle when the vehicle approaches a corner will be explained.

Figure 18:
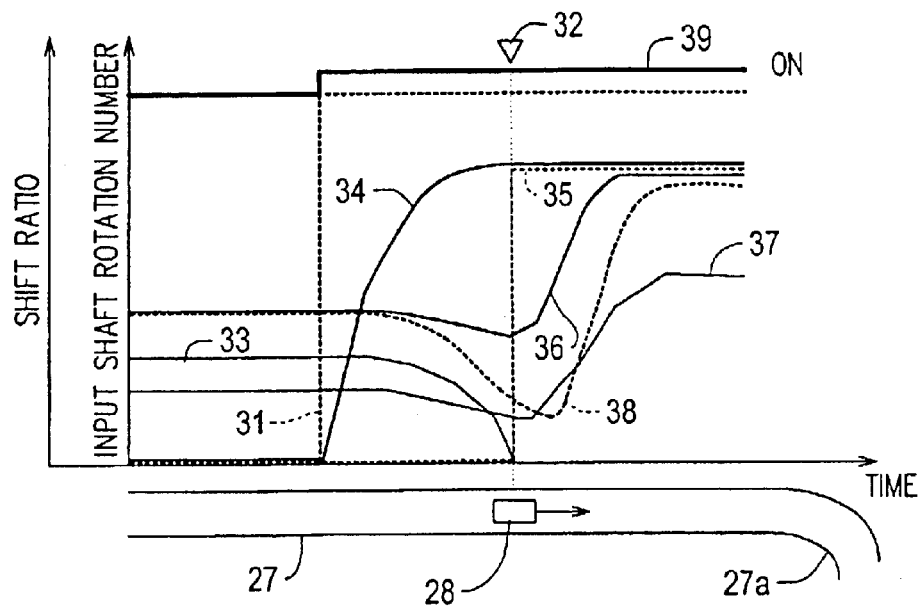
FIG. 18 is a diagram showing a state of corner control in a case in which the accelerator opening is relatively small according to the second embodiment of the present invention.
Figure 19:
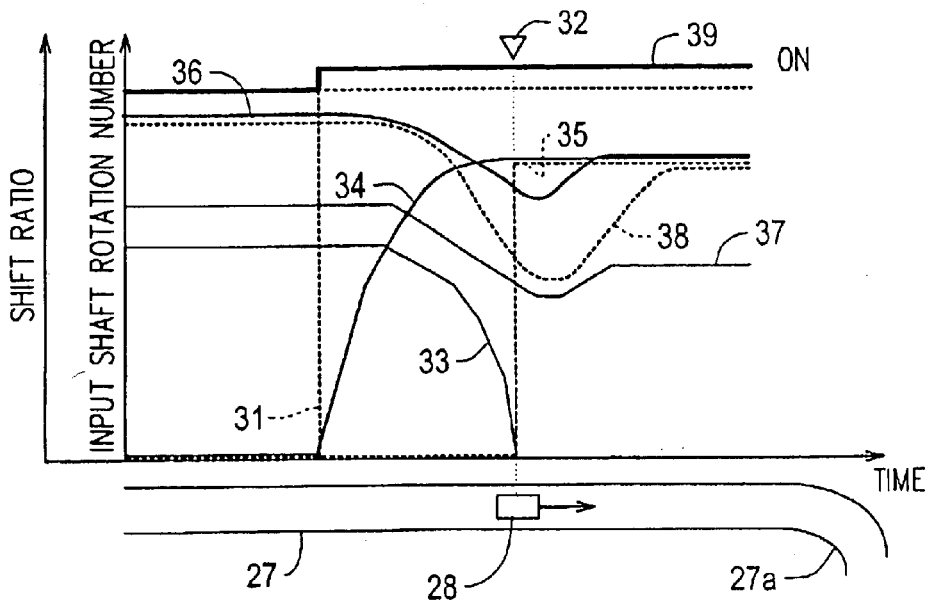
FIG. 19 is a diagram showing a state of corner control in a case in which the accelerator opening is relatively large according to the second embodiment of the present invention.

FIG. 18 is a diagram showing the state of corner control where the accelerator opening is relatively small according to the second embodiment of the present invention, and FIG. 19 is a diagram showing the state of corner control where the accelerator opening is relatively large according to the second embodiment of the present invention. Further, in the diagrams, the horizontal axis shows time, and the vertical axis shows the shift ratio and the input shaft rotation number.

First, the state of corner control in a case in which the accelerator opening is relatively small will be explained. Further, the explanation of items that are the same as those shown in FIG. 1 and FIG. 15 according to the first embodiment will be omitted by using the same reference numerals.

In FIG. 18, a reference numeral 39 denotes the corner control running flag line that shows whether or not the corner control running flag is on. In the case of low values, the corner control running flag line shows that the flag is off. In the case of high values, the corner control running flag shows the flag is on.

In the graph, because the changes in the accelerator opening curve 33, the recommended input shaft rotation number curve 34 and the conventional transitional target input shaft rotation curve 38 are the same as in FIG. 1 according to the first embodiment, the explanation will be omitted. Here, if the vehicle 28 reaches a position corresponding to the corner control starting point 31, the continuously variable transmission control device 30 judges that the necessary deceleration is equal to or greater than a specified value, begins corner control, and turns the corner control running flag on. Next, the calculation of the recommended input shaft rotation number for the corner 27a is started, and the target input shaft rotation number remains at the initial value (zero).

Meanwhile, after passing the corner control starting point 31, as the vehicle 28 approaches the corner 27a the driver for the vehicle 28 returns the accelerator in order to decelerate, as shown by the accelerator opening curve 33. In this case, according to the embodiment, because upshifting is not prohibited, the transitional target input shaft rotation number lowers, as shown by the transitional target input shaft rotation number curve 36. However, in a case in which the corner control running flag is on, because the shifting speed coefficient at the time of upshifting is set at a small value, the transitional target input shaft rotation number curve 36 gently lowers. Therefore, as shown by the shift ratio curve 37, upshifting is slowly executed.

Then, at the idling state starting point 32, if the accelerator is fully returned and completely closed, because the recommended input shaft rotation number is substituted for the target input shaft rotation number, the target input rotation number curve 35 overlaps the recommended input shaft rotation number curve 34. Therefore, because the target input rotation number is larger than the transitional target input rotation number, the transitional target input shaft rotation number is calculated in order for the actual input shaft rotation number to smoothly come near to the target input shaft rotation number. Thus, the transitional target input shaft rotation number increases, as shown by the transitional target input shaft rotation number curve 36.

Next, because the shift ratio of the continuously variable transmission 20 is controlled so that the actual input shaft rotation number matches the transitional target input shaft rotation number that was calculated, it changes as shown by the shift ratio curve 37.

In this manner, according to the embodiment, after the vehicle 28 enters the interval prior to the corner 27a until it reaches the idling state starting point 32, slow and slight upshifting is executed, and the shift ratio, after slightly lowering, smoothly increases after passing the idling state starting point 32, and smooth downshifting is executed. Consequently, even if upshifting is executed, because the change in the shift ratio is extremely small, deceleration force due to engine braking hardly decreases, and the driver does not experience a sensation of idle running. Also, after the slow and slight upshifting, smooth downshifting is executed. Therefore, the driving force smoothly changes, and driving force control that corresponds to the accelerator operations by the driver is executed.

Next, the state of corner control in a case in which the accelerator opening is relatively large will be explained. Further, the explanation for items that are the same as those shown in FIG. 15 according to the first embodiment will be omitted.

Also in this case, after the corner control start point 31 is passed, as the vehicle 28 approaches the corner 27a, the driver for the vehicle 28 returns the accelerator in order to decelerate. Next, according to the embodiment, because the upshifting prohibition processing is not implemented, as shown by the transitional target input shaft rotation number curve 36, the transitional target input shaft rotation number lowers. However, in a case in which the corner control running flag is on, because the shifting speed coefficient when upshifting is set at a small value, the transitional target input shaft rotation number curve 36 gently lowers. Therefore, the transitional target input shaft rotation number becomes smaller than the final target input shaft rotation number, but the difference is nominal. Also, as shown by the shift ratio curve 37, upshifting is slowly executed.

Then, in the idling state starting point 32, if the accelerator is fully returned and completely closed, the recommended input shaft rotation speed is substituted for the target input shaft rotation number. Therefore, the target input rotation number curve 35 overlaps the recommended input shaft rotation curve 34. Therefore, because the target input shaft rotation number becomes larger than the transitional target input shaft rotation number, the transitional target input shaft rotation number is calculated in order for the actual input shaft rotation number to smoothly come near to the target input shaft rotation number. Thus, the transitional target input shaft rotation number increases as shown by the transitional target input shaft rotation number curve 36.

In such a manner, according to the embodiment, in a case in which the vehicle 28 enters the interval prior to the corner 27a in a state in which the accelerator opening is relatively large, in response to the returning of the accelerator by the driver for the vehicle 28, after the transitional target input shaft rotation number gently decreases to just below the final target input shaft rotation number, it increases slightly, and then matches the final target input shaft rotation number. Therefore, the shift speed of the continuously variable transmission 20, after upshifting is slowly executed, becomes constant after slight downshifting is executed. Consequently, even if downshifting is executed after upshifting, because the change in the shift ratio is extremely small, the driving force smoothly changes, the driver does not experience a feeling of discomfort, and driving force control that matches the senses of the driver is conducted.

In this manner, according to the embodiment, in the interval prior to the corner 27a, the shifting speed coefficient in a case which upshifting is executed is set at a small value. In other words, the continuously variable transmission 20 is controlled so that the shifting operation that corresponds to the decrease in the accelerator opening is eased.

Therefore, while adopting a simple control algorithm, shifting of the continuously variable transmission 20 is smoothly conducted, driving force smoothly fluctuates, and deceleration force due to engine braking that corresponds to the corner can be obtained. Accordingly, driving force control that matches the accelerator operations by the driver can be conducted, and the drivability for the vehicle 28 can be improved.

Also, in a case in which upshifting is executed after the corner 27a is passed, because the shifting speed coefficient is set at a larger value, it is possible to quickly return to normal control within a range in which the driver does not experience a feeling of discomfort.

Further, the present invention is not limited to the embodiments, and various modifications can be made without departing from the true spirit of the present invention, and the scope of the present invention.

The disclosure of Japanese Patent Application No. 2001-392201 filed on Dec. 25, 2001 including the specification, drawings and claims are incorporated by reference in their entirety.

What is claimed is:

1. A driving force control apparatus for a vehicle, comprising:

an accelerator opening sensor that detects an accelerator opening for a vehicle; and an automatic transmission control device that controls an automatic transmission based on a road information and the accelerator opening, wherein the automatic transmission control device, in an interval prior to a deceleration required interval, controls the automatic transmission so as to ease a shifting operation that corresponds to a decrease in the accelerator opening, and wherein the interval prior to the deceleration required interval begins when a predetermined condition is satisfied.

2. The driving force control apparatus for the vehicle according to claim 1, wherein in the interval prior to the deceleration required interval based on a position for the vehicle, when the accelerator opening is in a completely closed state, the automatic transmission control device controls the automatic transmission by using a recommended input shaft rotation number for the deceleration required interval as a target input shaft rotation number for the deceleration required interval.

3. The driving force control apparatus for the vehicle according to claim 1, wherein in the interval prior to the deceleration required interval based on the position for the vehicle, when the accelerator opening is not in a completely closed state and an actual input shaft rotation number of the automatic transmission is lower than the recommended input shaft rotation number for the deceleration required interval, the automatic transmission control device controls the automatic transmission by using the actual input shaft rotation number as a target input shaft rotation number for the deceleration required interval.

4. The driving force control apparatus for the vehicle according to claim 3, wherein the automatic transmission control device controls the automatic transmission so that upshifting is not executed when the accelerator opening is completely closed.

5. The driving force control apparatus for the vehicle according to claim 1, wherein, in the interval prior to the deceleration required interval based on the position for the vehicle, when the accelerator opening is not in a completely closed state and an actual input rotation number of the automatic transmission is higher than the recommended input shaft rotation number for the deceleration required interval, the automatic transmission control device controls the automatic transmission by using the recommended input shaft rotation number as a target input shaft rotation number for the deceleration required interval.

6. The driving force control apparatus for the vehicle according to claim 5, wherein the automatic transmission control device controls the automatic transmission so that a shifting speed is lowered.

7. The driving force control apparatus for the vehicle according to claim 1, wherein when the deceleration required interval based on the position for the vehicle continues, the automatic transmission control device controls the automatic transmission so that the shifting speed is lowered and downshifting is executed.

8. The driving force control apparatus for the vehicle according to claim 1, further comprising a road information transmission device that transmits road information to the automatic transmission control device.

9. The driving force control apparatus for the vehicle according to claim 1, wherein the road information includes a road shape or a road gradient.

10. The driving force control apparatus for the vehicle according to claim 1, wherein the automatic transmission is a continuously variable transmission.

11. The driving force control apparatus for the vehicle according to claim 1, wherein in the interval prior to the deceleration required interval based on the position for the vehicle, when the accelerator opening is not in a completely closed state, a target input shaft rotation number for the deceleration required interval is set to zero.

12. The driving force control apparatus for the vehicle according to claim 1, wherein in the interval prior to the deceleration required interval based on the position for the vehicle, when the accelerator opening is not in a completely closed state, the automatic transmission control device controls the automatic transmission by using an initial value of a target input shaft rotation number for the deceleration required interval.

13. The driving force control apparatus for the vehicle according to claim 12, wherein, in the interval prior to the deceleration required interval based on the position for the vehicle, the automatic transmission control device controls the automatic transmission so that a shifting speed is lowered and upshifting is executed when the accelerator opening is completely closed.

14. A method of controlling a driving force for a vehicle, comprising:

detecting an accelerator opening for a vehicle; and controlling an automatic transmission based on a road information and the accelerator opening, wherein controlling the automatic transmission, in an interval prior to a deceleration required interval, eases a shifting operation that corresponds to a decrease in the accelerator opening, and wherein the interval prior to the deceleration required interval begins when a predetermined condition is satisfied.

15. The method of claim 14, wherein in the interval prior to the deceleration required interval based on a position for the vehicle, when the accelerator opening is in a completely closed state, controlling the automatic transmission by using a recommended input shaft rotation number for the deceleration required interval as a target input shaft rotation number for the deceleration required interval.

16. The method of claim 14, wherein in the interval prior to the deceleration required interval based on the position for the vehicle, when the accelerator opening is not in a completely closed state and an actual input shaft rotation number of the automatic transmission is lower than the recommended input shaft rotation number for the deceleration required interval, controlling the automatic transmission by using the actual input shaft rotation number as a target input shaft rotation number for the deceleration required interval.

17. The method of claim 16, wherein controlling the automatic transmission is performed so that upshifting is not executed when the accelerator opening is completely closed.

18. The method of claim 14, wherein, in the interval prior to the deceleration required interval based on the position for the vehicle, when the accelerator opening is not in a completely closed state and the actual input rotation number of the automatic transmission is higher than the recommended input shaft rotation number for the deceleration required interval, controlling the automatic transmission by using the recommended input shaft rotation number as a target input shaft rotation number for the deceleration required interval.

19. The method of claim 18, wherein controlling the automatic transmission is performed so that a shifting speed is lowered.

20. The method of claim 14, wherein when the deceleration required interval based on the position for the vehicle continues, controlling the automatic transmission is performed so that the shifting speed is lowered and downshifting is executed.

21. The method of claim 14, further comprising transmitting the road information to an automatic transmission control device.

22. The method of claim 14, wherein transmitting the road information includes transmitting a road shape or a road gradient.

23. The method of claim 14, wherein controlling the automatic transmission is performed with a continuously variable transmission.

24. The method of claim 14, further comprising, in the interval prior to the deceleration required interval based on the position for the vehicle, when the accelerator opening is not in a completely closed state, setting a target input shaft rotation number for the deceleration required interval to zero.

25. The method of claim 14, wherein in the interval prior to the deceleration required interval based on the position for the vehicle, when the accelerator opening is not in a completely closed state, controlling the automatic transmission by using an initial value of a target input shaft rotation number for the deceleration required interval.

26. The method of claim 25, wherein, in the interval prior to the deceleration required interval based on the position for the vehicle, controlling the automatic transmission is performed so that a shifting speed is lowered and upshifting is executed when the accelerator opening is completely closed.

* * * * *